(12) United States Patent
Li et al.

(10) Patent No.: US 12,084,973 B1
(45) Date of Patent: Sep. 10, 2024

(54) BLOCKAGE-PROOF WATER DIVERSION AND DRAINAGE DEVICES FOR HIGHWAY TUNNEL CONSTRUCTION

(71) Applicant: NORTHWEST INSTITUTE OF ECO-ENVIRONMENT AND RESOURCES, CAS, Gansu (CN)

(72) Inventors: Guoyu Li, Lanzhou (CN); Yapeng Cao, Lanzhou (CN); Dun Chen, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/642,808

(22) Filed: Apr. 22, 2024

(30) Foreign Application Priority Data

Oct. 16, 2023 (CN) .......................... 202311330727.1

(51) Int. Cl.
| | | |
|---|---|---|
| *E21F 16/02* | (2006.01) | |
| *B01D 29/56* | (2006.01) | |
| *B01D 29/64* | (2006.01) | |

(52) U.S. Cl.
CPC .............. *E21F 16/02* (2013.01); *B01D 29/56* (2013.01); *B01D 29/6476* (2013.01)

(58) Field of Classification Search
CPC ...... E21F 16/02; B01D 29/56; B01D 29/6476
See application file for complete search history.

(56) References Cited

FOREIGN PATENT DOCUMENTS

| | | |
|---|---|---|
| CN | 102434175 A | 5/2012 |
| CN | 210768908 U | 6/2020 |
| CN | 111580569 A | 8/2020 |
| CN | 113187549 A | 7/2021 |
| CN | 113931688 A | 1/2022 |
| CN | 114307306 A | 4/2022 |
| CN | 115559782 A | 1/2023 |
| CN | 218407537 U | 1/2023 |
| CN | 115680765 A | 2/2023 |
| CN | 218814268 U | 4/2023 |

(Continued)

OTHER PUBLICATIONS

Decision to Grant a Patent in Chinese Application No. 202311330727.1 mailed on Nov. 26, 2023, 8 pages.

*Primary Examiner* — Kyle Armstrong
(74) *Attorney, Agent, or Firm* — METIS IP LLC

(57) ABSTRACT

Disclosed is a blockage-proof water diversion and drainage device for highway tunnel construction. The device may include an inlet cleaning component, a diversion component connected to a bottom of the inlet cleaning component, a debris collection component connected to an end of the diversion component close to the inlet cleaning component, and a pre-storage component connected to a bottom of the diversion component. An outlet end of the pre-storage component may be connected to the debris collection component. An openable baffle component and a screen plate may be provided inside a main pipe of the diversion component which can transfer filtered sludge and other debris to the debris collection component, keeping the main pipe clean, maintaining the drainage speed of accumulated water, and reducing the frequency of manual cleaning. Additionally, the device can scrape and clean a surface of the screen plate to prevent blocked, thus extending device maintenance time.

10 Claims, 13 Drawing Sheets

(56) References Cited

FOREIGN PATENT DOCUMENTS

| CN | 116378753 A | | 7/2023 | |
|---|---|---|---|---|
| EP | 1035300 A1 | | 9/2000 | |
| JP | 2008307535 A | * | 12/2008 | |
| KR | 20120110228 A | * | 10/2012 | |
| WO | WO-2021119740 A1 | * | 6/2021 | ......... B01D 19/0042 |
| WO | WO-2021129194 A1 | * | 7/2021 | ............. B01D 29/56 |

* cited by examiner

BLOCKAGE-PROOF WATER DIVERSION AND DRAINAGE DEVICES FOR HIGHWAY TUNNEL CONSTRUCTION

CROSS-REFERENCE TO RELATED APPLICATIONS

This application claims priority to Chinese Patent Application No. 202311330727.1, filed on Oct. 16, 2023, the entire contents of which are hereby incorporated by reference.

TECHNICAL FIELD

The present disclosure relates to the field of tunnel construction technology, and in particular to blockage-proof water diversion and drainage devices for highway tunnel construction.

BACKGROUND

Tunnels are underground structures embedded within geological formations, serving as a form of human utilization of subterranean space. Tunnels can be classified into various types such as a transportation tunnel, a hydraulic tunnel, a municipal tunnel, and a mining tunnel. During construction of a tunnel, water accumulation often occurs inside the tunnel. To facilitate construction operations, it is necessary to drain the accumulated water from the tunnel using an appropriate drainage facility. Currently, drainage within tunnels is typically achieved by directly diverting accumulated water out through a drainage pipe or by employing the drainage pipes in conjunction with a pump to pump out the accumulated water.

Due to the presence of debris such as rubble and stones in the accumulated water inside tunnel, an inlet of the drainage pipe is prone to blockage during the drainage process. Moreover, over time, the accumulation of debris inside the pipe can lead to blockages, resulting in poor drainage performance of the drainage facility and reducing an operational lifespan thereof, which increases maintenance costs of subsequent drainage facilities.

SUMMARY

One or more embodiments of the present disclosure provide a blockage-proof water diversion and drainage device for highway tunnel construction. The blockage-proof water diversion and drainage device may include an inlet cleaning component, a diversion component connected to a bottom of the inlet cleaning component, a debris collection component connected to an end of the diversion component close to the inlet cleaning component, and a pre-storage component connected to a bottom of the diversion component, wherein an outlet end of the pre-storage component is connected to the debris collection component. The inlet cleaning component may include a water inlet pipe and a water inlet nozzle may be fixedly connected to a top of the water inlet pipe. A plurality of clearance assemblies may be connected to a top of the water inlet nozzle, a mounting collar may be fixedly connected to a top of the plurality of clearance assemblies, and a plurality of openable cover plates may be arranged around a top of the mounting collar in a circular pattern. A hydraulic rod may be provided between the water inlet nozzle and each of the plurality of openable cover plates. The hydraulic rod may be used to control the opening or closing of the cover plate. A filter assembly may be fixedly connected to the water inlet nozzle. The diversion component may include a main pipe, with an inlet connection port provided on a top of the main pipe, and the inlet connection port may be connected to the water inlet pipe. One end of the main pipe may be connected to the debris collection component, and an openable baffle component may be provided in an internal passage between the inlet connection port of the main pipe and the debris collection component. The openable baffle component may be used for controlling a communication state between the main pipe and the debris collection component. A screen plate may be provided on an inner wall of the inlet connection port of the main pipe on a side away from the baffle component. The pre-storage component may include one or more storage hoppers, which may be connected to the main pipe. A bottom of each of the one or more storage hoppers may be connected to a sludge pipe and an outlet end of the sludge pipe may be connected to the debris collection component. One or more spiral blades may be rotationally provided in an interior of the sludge pipe for transporting sludge to the debris collection component for centralized treatment when turned on.

Some embodiments of the present disclosure may provide the following beneficial effects: (1) In some embodiments of the present disclosure, by providing the inlet cleaning component, a top of the water inlet nozzle remains horizontal to the ground. After filtering out large stones and debris, sewage enters the main pipe through the water inlet nozzle. The plurality of clearance assemblies are utilized to push away debris near a leakage outlet near the mounting collar and the water inlet nozzle, preventing blockage. In case surrounding debris threatens to bury the leakage outlet, the hydraulic rod pushes upwards, pushing the plurality of openable cover plates outward. The plurality of openable cover plates rotate along the mounting collar, gradually increasing an inclination angle to dislodge debris covering a region above the plurality of openable cover plates, thus preventing obstruction or covering of the inlet, and ensuring timely drainage of accumulated water. (2) In some embodiments of the present disclosure, by providing the plurality of clearance assemblies and the filter assembly, debris at the water inlet nozzle is cleaned to prevent rubble from being carried by the accumulated water and accumulating around, which may hinder water drainage. An upper rotating plate and a lower rotating plate of the clearance assembly rotate in opposite directions and a plurality of first toggle columns and a plurality of second toggle columns provided on the upper rotating plate and the lower rotating plate move debris aside, reducing the gradual accumulation of debris around, thereby facilitating smoother drainage when water accumulation is minimal. A plurality of cleaning rods are located in slits of a filter plate and a rotary shaft drives the plurality of cleaning rods to move back and forth in the slits of the filter plate, preventing soil from blocking the filter plate and affecting filtration speed, thus accelerating water drainage. (3) In some embodiments of the present disclosure, by providing the diversion component, after accumulated water enters the main pipe, the accumulated water is obstructed by the baffle component, avoiding entry of the accumulated water into the debris collection component. Water flows through the screen plate with a smaller pore diameter than the filter assembly, further filtering out stones in the accumulated water. When water flow is low, under the elasticity of the spring leaf, resistance plates approach each other, reducing the space inside the main pipe, decreasing the water flow section, thus increasing water flow velocity, scouring the inner wall of the main pipe, and reducing dirt deposition. When water flow is high, two deflectors are compressed to both sides by water impact, pushing the resistance plates towards the main pipe wall, enlarging the space inside the main pipe, slowing down water flow to prevent excessive impact force from affecting filtration efficiency, reducing damage to the device. (4) In some embodiments of the present disclosure, by providing the baffle component, when debris entering from the water inlet nozzle reaches a certain amount between a baffle plate and the screen plate, a lifting actuator is controlled to lower down, causing the baffle plate to open. During the opening process, a bottom plate of the baffle plate moves upwards, causing a scraping head to move upwards along a sliding channel, scraping off debris adhering to the surface of the screen plate, reducing the impact of adhering debris on water drainage speed. An upper pad may be provided on the bottom plate of the baffle plate, where a movable scraper may be in a sliding fit with the upper pad, covering a gap between the movable scraper and the bottom plate, preventing debris from entering the gap. (5) In some embodiments of the present disclosure, some flexible debris may hang on the screen plate in long strip shapes, which are not easily washed away by water flow and may cause blockage after accumulating for a long time. By providing a cleaning assembly, when a rotating plate of the cleaning assembly rotates, a plurality of brush heads contact the screen plate. The plurality of brush heads have rotational freedom, allowing them to rotate freely. As the plurality of brush heads rotate, they undergo relative displacement with a plurality of cutting knives on a mounting ring, thereby the cutting knives can cut off debris, allowing the debris to be washed away by water flow without accumulation and enhancing water flow velocity. (6) In some embodiments of the present disclosure, by providing the pre-storage component and the debris collection component, after filtration, large pieces of rubble are filtered out from the accumulated water, but sediment remains unfiltered, easily depositing at the bottom of the main pipe, causing difficulties in pipe cleaning, and prolonged accumulation may lead to pipe blockage or affect water flow velocity. The sediment sinks through the one or more storage hoppers, where sludge flows to the sludge pipe, and is then transported to the debris collection component for centralized treatment via one or more spiral blades, keeping the main pipe clean, maintaining water drainage speed, reducing the frequency of manual cleaning, and extending device maintenance time.

BRIEF DESCRIPTION OF THE DRAWINGS

The present disclosure will be further illustrated by way of exemplary embodiments, which will be described in detail with reference to the accompanying drawings. These embodiments are not limiting. In these embodiments, the same numbering indicates the same structure, wherein.

DETAILED DESCRIPTION

Figure 1:
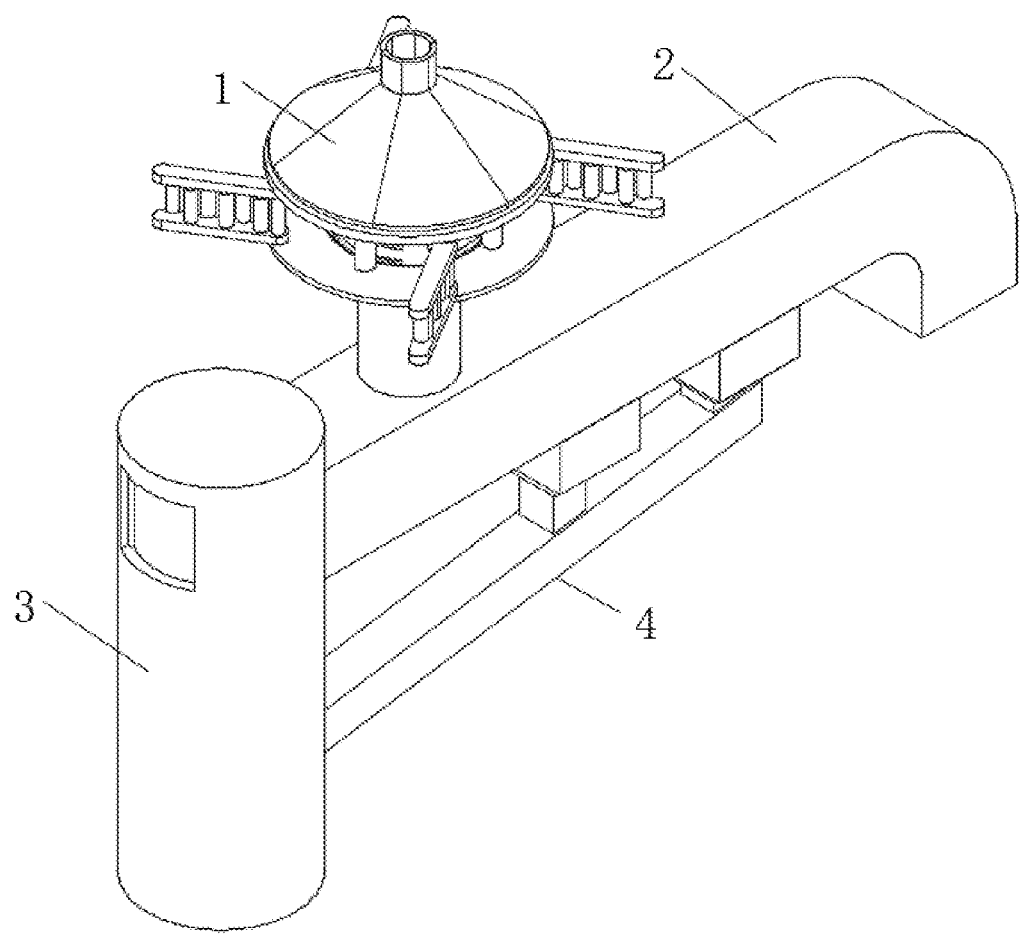
FIG. 1 is a schematic diagram illustrating a primary view structure of a blockage-proof water diversion and drainage device for highway tunnel construction according to some embodiments of the present disclosure.

In order to further illustrate the technical solutions of the embodiments of the present disclosure, a brief introduction will be made to the drawings required for the description of the embodiments. It is obvious that the drawings described below are only examples or embodiments of the present disclosure. For those skilled in the art, without exercising inventive labor, the present disclosure may also be applied to other similar scenarios based on these drawings. Unless otherwise indicated or specified from the context, identical reference numerals in the drawings represent identical structures or operations.

It should be understood that the terms "system," "device," "unit," and/or "module" used herein are employed to distinguish different levels of various components, elements, parts, or assemblies. However, if other words can achieve the same purpose, they may be replaced with alternative expressions.

As shown in the present disclosure and the claims, unless otherwise clearly indicated by the context, terms such as "one," "a," "an," and/or "the" are not specifically limited to singular forms and may also include plural forms. Generally, the terms "comprise," "comprises," "comprising," "include," "includes," and "including" only indicate the presence of the explicitly identified operations and elements, and these operations and elements do not constitute an exclusive listing. Methods or devices may also include other operations or elements.

Flowcharts are used in the present disclosure to illustrate the operations performed by the system according to the embodiments of the present disclosure. It should be understood that the preceding or following operations are not necessarily performed in the exact order. Instead, various steps may be processed in reverse order or simultaneously.

Meanwhile, other operations may be added to these procedures, or a certain operation or operations may be removed from these procedures.

Figure 2:
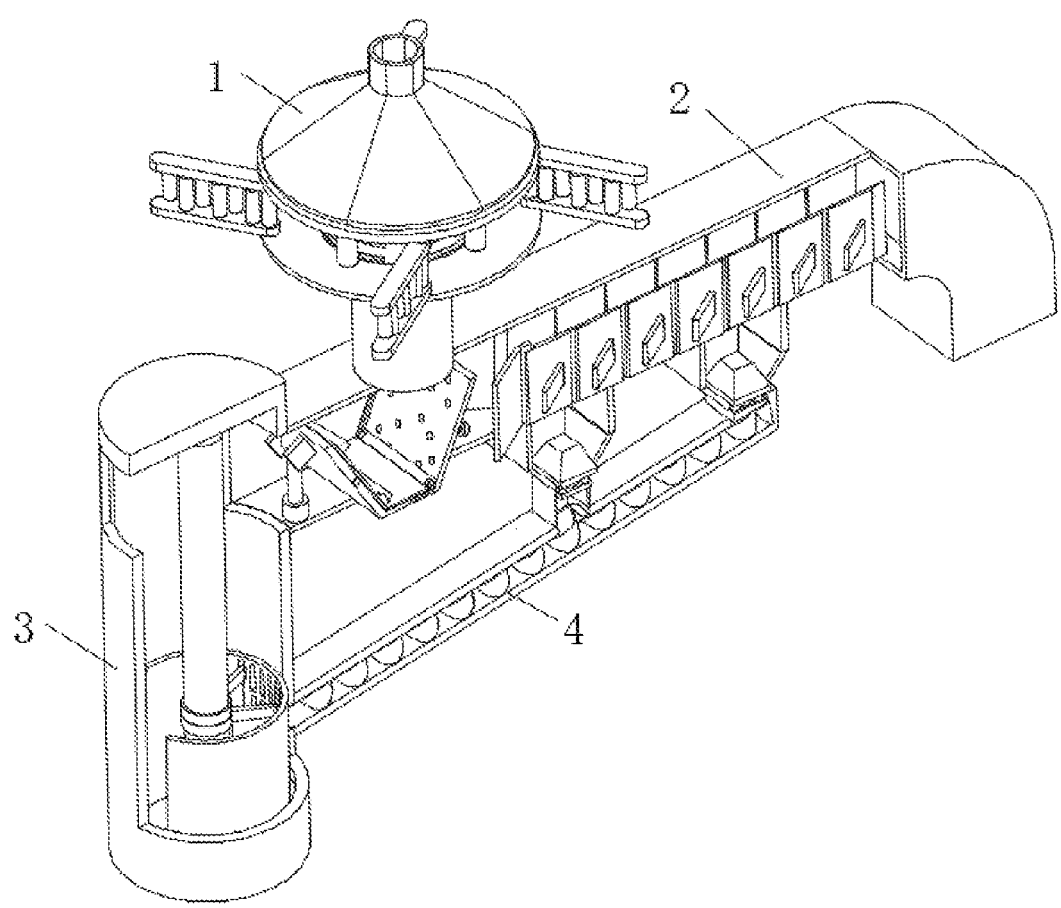
FIG. 2 is a schematic diagram illustrating a cross-sectional structure of a blockage-proof water diversion and drainage device for highway tunnel construction according to some embodiments of the present disclosure.
Figure 3:
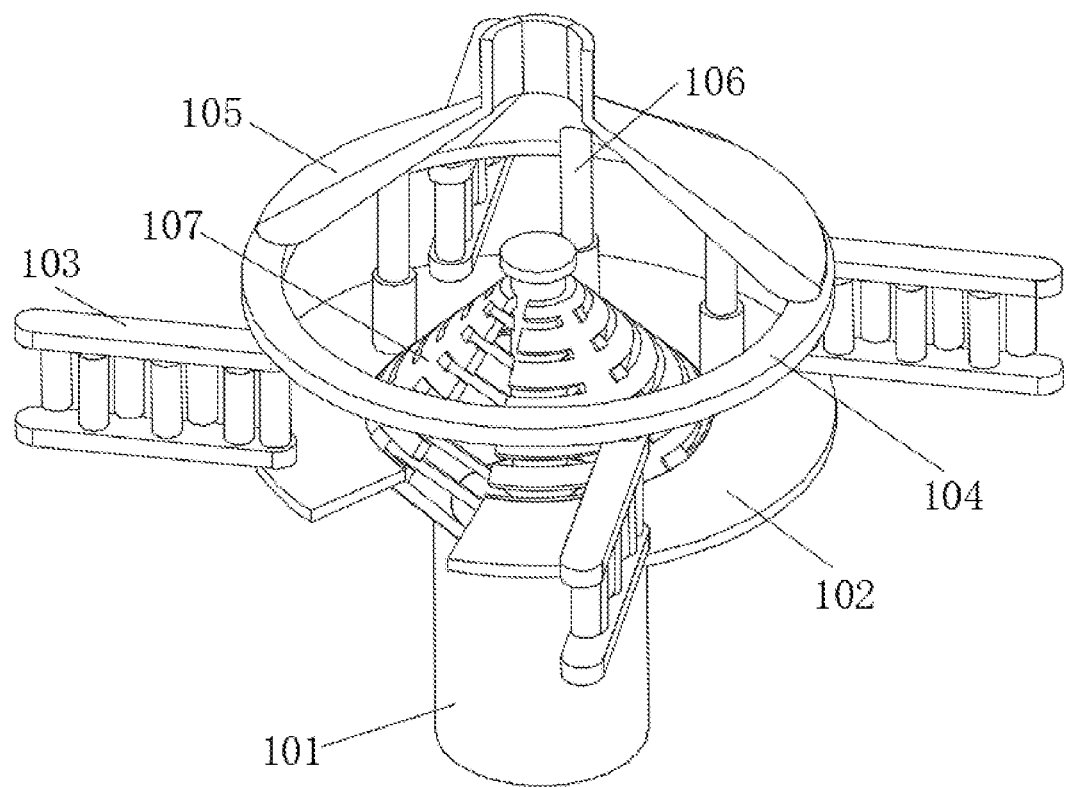
FIG. 3 is a schematic structural diagram illustrating an inlet cleaning component according to some embodiments of the present disclosure.

FIG. 1 is a schematic diagram illustrating a primary view structure of a blockage-proof water diversion and drainage device for highway tunnel construction according to some embodiments of the present disclosure. FIG. 2 is a schematic diagram illustrating a cross-sectional structure of a blockage-proof water diversion and drainage device for highway tunnel construction according to some embodiments of the present disclosure. FIG. 3 is a schematic structural diagram illustrating an inlet cleaning component according to some embodiments of the present disclosure.

In some embodiments, as shown in FIGS. 1-3, the blockage-proof water diversion and drainage device for highway tunnel construction (hereinafter referred to as the water diversion and drainage device) may include an inlet cleaning component 1, a diversion component 2 connected to a bottom of the inlet cleaning component 1, a debris collection component 3 connected to an end of the diversion component 2 close to the inlet cleaning component 1, and a pre-storage component 4 connected to a bottom of the diversion component 2. An outlet end of the pre-storage component 4 may be connected to the debris collection component 3.

The inlet cleaning component 1 may be used to push debris away from a leakage outlet to facilitate the inflow of accumulated water. In some embodiments, the inlet cleaning component 1 may include a water inlet pipe 101, and a water inlet nozzle 102 may be connected to a top of the water inlet pipe 101 in various manners. A plurality of clearance assemblies 103 may be connected to a top of the water inlet nozzle 102, and the plurality of clearance assemblies 103 may be used to push debris away from the vicinity of the leakage outlet between a mounting collar 104 and the water inlet nozzle 102 in order to avoid blockage of the leakage outlet. The mounting collar 104 may be fixedly connected to a top of the plurality of clearance assemblies 103 in various manners, and a plurality of openable cover plates 105 may be arranged around a top of the mounting collar 104 in a circular pattern. In some embodiments, a bottom end of each of the plurality of openable cover plates 105 may be hinged to the mounting collar 104, and the hinged connection may include, but is not limited to, a hinge connection, a clamp hinge connection, or the like.

In some embodiments, a hydraulic rod 106 may be provided between the water inlet nozzle 102 and each of the plurality of cover plates 105, respectively, and the hydraulic rod 106 may be used to control the opening or closing of the cover plate 105. Once a situation occurs in which surrounding rocks and debris bury the leakage outlet, the hydraulic rod 106 may be controlled to push upward to push the cover plate 105 outward, gradually increasing an inclination angle of the cover plate 105, which helps to dislodge the debris covering the leakage outlet, preventing blockage or covering of the leakage outlet, thereby ensuring timely drainage.

In some embodiments, a filter assembly 107 may be fixedly connected to the water inlet nozzle 102 via a variety of connection manners. The connection manners may include threaded connections, welding, or the like. After filtering large stones and other debris through the filter assembly 107, water enters the water inlet pipe 101 from the water inlet nozzle 102 and then enters the diversion component 2 from the water inlet pipe 101 passes through the water inlet 102 to the water inlet pipe 101, and then from the water inlet pipe 101.

Figure 4:
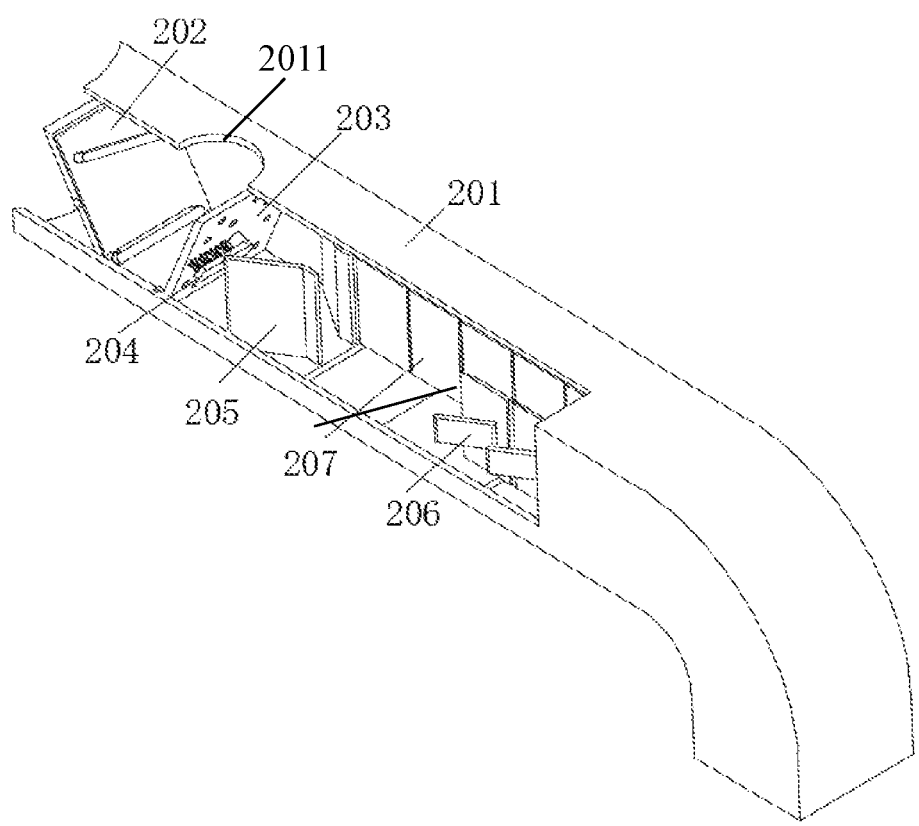
FIG. 4 is a schematic structural diagram illustrating a diversion component according to some embodiments of the present disclosure.

FIG. 4 is a schematic structural diagram illustrating a diversion component according to some embodiments of the present disclosure.

In some embodiments, as shown in FIG. 4, the diversion component 2 may be used to divert accumulated water after preliminary filtration to the pre-storage component 4. In some embodiments, the diversion component 2 may include a main pipe 201, with an inlet connection port 2011 at a top of the main pipe 201, and the inlet connection port 2011 may be connected to the water inlet pipe 101. The accumulated water enters the main pipe 201 along the water inlet pipe 101 via the inlet connection port 2011. One end of the main pipe 201 may be connected to the debris collection component 3. An openable baffle component 202 may be provided in an internal passage between the inlet connection port 2011 of the main pipe 201 and the debris collection component 3. The openable baffle component 202 may be used to control a communication state between the main pipe 201 and the debris collection component 3. The baffle component 202 may be opened when needed to drain the debris that accumulates underneath the inlet connection port 2011 into the debris collection component 3.

In some embodiments, a screen plate 203 may be provided on an inner wall of the inlet connection port 2011 of the main pipe 201 on a side away from the baffle component 202, and the screen plate 203 may be disposed opposite the baffle component 202. In some embodiments, the screen plate 203 may be disposed at an angle. Debris in the water is filtered through the screen plate 203, and the filtered accumulated water flows to an outlet of the main pipe 201. In some embodiments, a cleaning assembly 204 may be provided at a back of the screen plate 203 to remove debris adhering to the back of the screen plate 203.

In some embodiments, two deflectors 205 may be symmetrically and rotationally mounted on an inner wall of a side of the main pipe 201 away from the screen plate 203, the two deflectors 205 being disposed on the same side of the screen plate 203 with respect to the inlet connection port 2011. Each of the two deflectors 205 may be connected to a resistance plate 207, and an outer wall of the resistance plate 207 may be snap-fit to an outer wall of each of the two deflectors 205 via a variety of connection manners, such as a snap-fit connection, a hinge connection, or the like. A spring leaf 206 may be rotationally connected between the resistance plate 207 and the inner wall of the main pipe 201, i.e., two ends of the spring leaf 206 are rotationally connected to the resistance plate 207 and the inner wall of the main pipe 201, respectively. When accumulated water enters the main pipe 201, the accumulated water is blocked by the baffle component 202 and prevented from entering the debris collection component 3. When the accumulated water flows through the screen plate 203, a diameter of a pore of the screen plate 203 is smaller than the filter assembly 107, effectively filtering the stones in the accumulated water. When the water flow is small, under an influence of an elastic force of the spring leaf 206, the resistance plates 207 approach each other, reducing a space within the main pipe 201, decreasing a water flow section, thus increasing water flow velocity, scouring the inner wall of the main pipe 201, and reducing dirt deposition. When the water flow is large, the two deflectors 205 are compressed to two sides by an impact of the accumulated water. The two deflector 205 may be connected to edge sides of the resistance plates 207, so that when the two deflectors 205 move toward the wall of the main pipe 201, the two deflectors 205 drive the resistance plates 207 to move in the same direction, thereby expanding the space within the main pipe 201, slowing down the flow of water, avoiding excessive flow velocity, and reducing an impact force that may affect the filtration efficiency, thereby reducing damage to the water diversion and drainage device, and extending a service life of the water diversion and drainage device. When debris entering from the inlet connection port 2011 accumulates between a baffle plate 2022 and the screen plate 203 to a certain amount, the baffle component 202 opens to discharge the debris to the debris collection component 3, avoiding blockage due to long-term accumulation of debris or a slow flow velocity of the accumulated water, which affects the operation of the water diversion and drainage device. Manners of rotational connection and mounting may include, but are not limited to, bearings, hinges, or the like.

Figure 6:
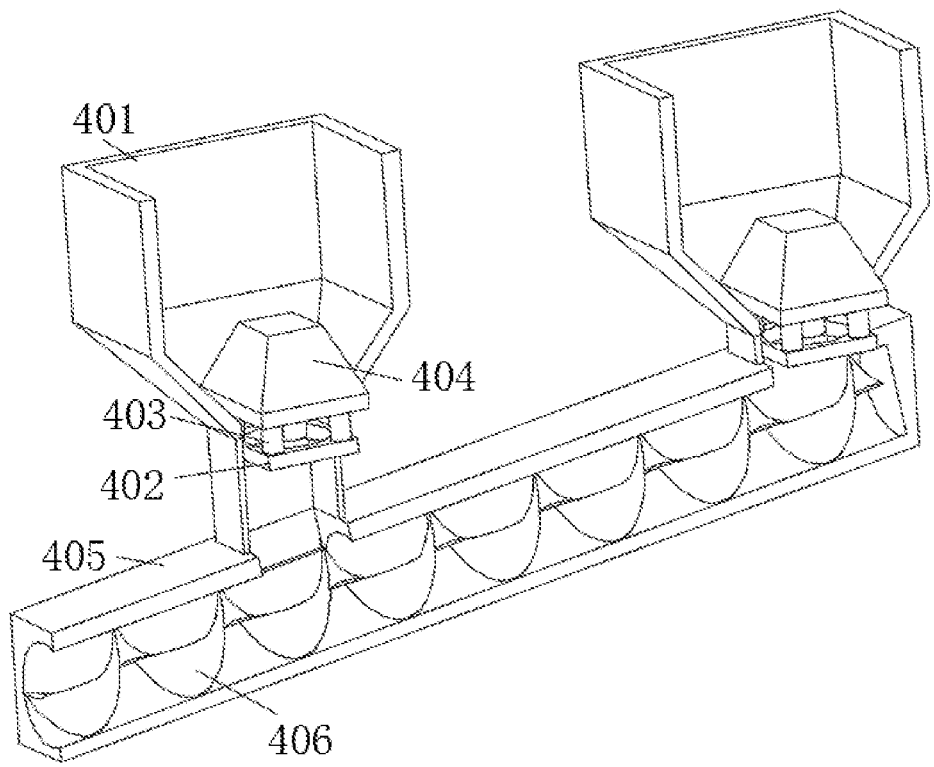
FIG. 6 is a schematic structural diagram illustrating a pre-storage component according to some embodiments of the present disclosure.

FIG. 6 is a schematic structural diagram illustrating a pre-storage component according to some embodiments of the present disclosure.

In some embodiments, the pre-storage component 4 may be used to transport sludge within the main pipe 201 to the debris collection component 3 for disposal, as shown in FIG. 6. In some embodiments, the pre-storage component 4 may include one or more storage hoppers 401 and a sludge pipe 405. The one or more storage hoppers 401 may be used to temporarily store the sludge, and when the sludge in the one or more storage hoppers 401 reaches a certain weight, it is discharged into the sludge pipe 405. A top of each of the one or more the storage hoppers 401 may be connected to the main pipe 201, and a bottom of each of the one or more the storage hoppers 401 may be connected to the sludge pipe 405.

In some embodiments, a mounting plate 402 may be provided in a communication pipeline between each of the one or more storage hoppers 401 and the sludge pipe 405, and an outer wall of the mounting plate 402 may be fixedly connected to an inner wall of the communication pipeline via a variety of connection manners. The connection manners may include threaded connection, welding, or the like. A flow-through hole may be opened in a center of the mounting plate 402, and a plurality of lifting columns 403 may be provided on the mounting plate 402, with a stopper 404 fixedly connected to a top of the plurality of lifting columns 403.

In some embodiments, the sludge pipe 405 may be inclined, an outlet end of the sludge pipe 405 may be connected to the debris collection component 3, and one or more spiral blades 406 may be rotationally provided in an interior of the sludge pipe 405. After accumulated water is filtered through the screen plate 203 of the main pipe 201, large debris is filtered out, but unfiltered sediment may accumulate at a bottom of the main pipe 201, making the main pipe 201 difficult to clean and leading to potential blockage or reduced flow velocity of the accumulated water due to prolonged accumulation. The sediment sinks through the storage hopper 401, and after accumulating for a period of time, the plurality of lifting columns 403 may be controlled to extend, lifting the stopper 404, allowing the sludge to flow through the flow-through hole into the sludge pipe 405. Then, the plurality of lifting columns 403 may be controlled to retract, causing the stopper 404 to block the communication pipeline between the storage hopper 401 and the sludge pipe 405. By opening the one or more spiral blades 406, the sludge is then transported to the debris collection component 3 for centralized processing.

In some embodiments, the storage hopper 401 may be connected to the main pipe 201 at a position away from the screen plate 203 for collecting sediment from the accumulated water filtered by the screen plate 203.

Figure 5:
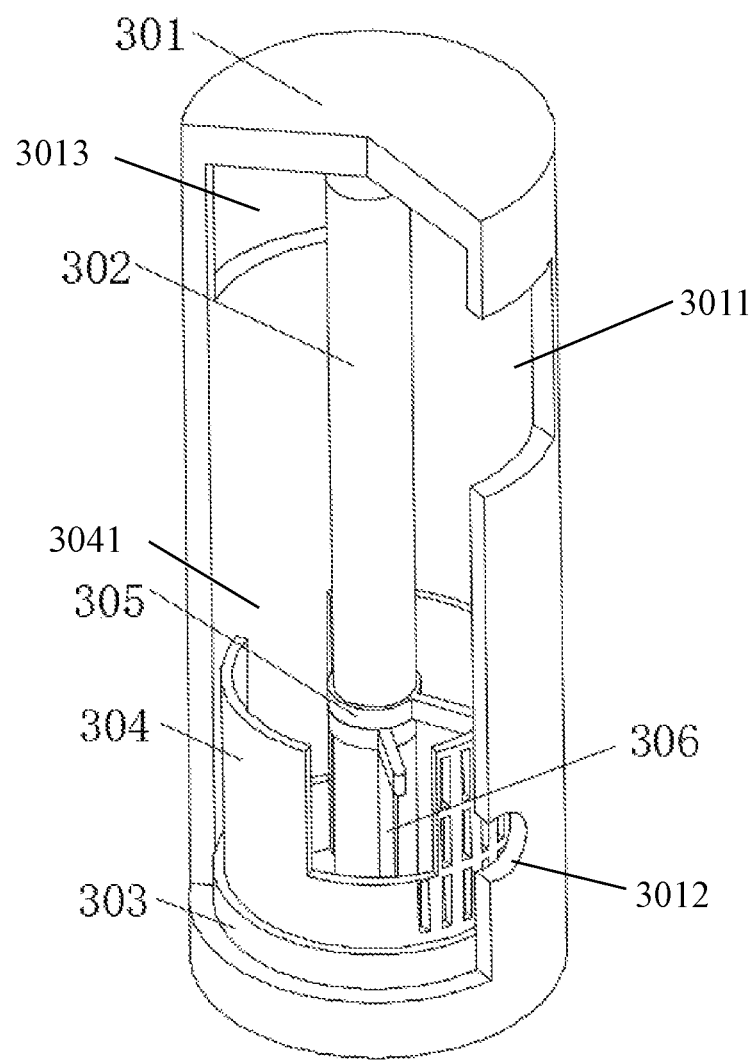
FIG. 5 is a schematic structural diagram illustrating a debris collection component according to some embodiments of the present disclosure.

FIG. 5 is a schematic structural diagram illustrating a debris collection component according to some embodiments of the present disclosure.

In some embodiments, the debris collection component 3 may be used to temporarily store sludge and debris from the pre-storage component 4 and the main pipe 201. In some embodiments, the debris collection component 3 may include a collection bucket 301. A first connection port 3011 for connecting with the main pipe 201, a second connection port 3012 for connecting with the sludge pipe 405, and a cleaning port 3013 may be provided on a wall of the collection bucket 301.

In some embodiments, a vertical telescopic column 302 may be fixedly connected to a top of an inner wall of the collection bucket 301 via a variety of connection manners. A collection tank 303 may be fixedly connected to a bottom of the vertical telescopic column 302 via various connection manners, and a bottom of the collection tank 303 may be rotationally provided with a baffle cylinder 304. An outer wall of the vertical telescopic column near one end of the collection tank 303 may be rotationally mounted with a rotating ring 305, an outer wall of the rotating ring 305 may be fixedly connected with a cleaning plate 306 via a variety of connection manners, and an opening 3041 may be provided on one side of the baffle cylinder. Debris in the accumulated water is transported via the main pipe 201 and the sludge pipe 405 to the collection tank 303 within the collection bucket 301, and the opening 3041 provided on the one side of the baffle cylinder 304 is controlled to align with the sludge pipe 405 during an sludge input. When an interior of the collection tank 303 needs to be cleaned, the opening 3041 of the baffle cylinder 304 is aligned with a position directly below the cleaning port 3013 of the collection bucket 301, and then the vertical telescopic column 302 drives the collection tank 303 upward. When the collection tank 303 is risen to the level of the cleaning port 3013, excess water inside the collection tank 303 is filtered out through dense holes provided on the baffle cylinder 304. By controlling the rotating ring 305 to rotate, the cleaning plate 306 pushes the debris in the collection tank 303 outward, facilitating manual cleaning of the cleaning port 3013 to collect the debris. This process helps to keep the main pipe 201 clean, maintain a drainage speed of accumulated water, reduce a frequency of manual cleaning, and extend a maintenance time of the water diversion and drainage device. The connection manners may include, but are not limited to, threaded connections, welding, or the like. Manners of rotational mounting may include, but are not limited to, bearings, hinges, or the like.

In some embodiments, when the blockage-proof water diversion and drainage device for highway tunnel construction is in operation, accumulated water filters large stones and debris, etc., through the filter assembly 107 and enters the main pipe 201 from the water inlet nozzle 102. The plurality of clearance assemblies 103 are capable of pushing debris away from the vicinity of a leakage outlet to avoid blockage of the leakage outlet. Once a situation occurs in which surrounding rocks and debris bury the leakage outlet, the hydraulic rod 106 may be controlled to push upward, pushing the plurality of cover plates 105 outward, and an opening angle of the cover plate 105 gradually increases to dislodge the debris covered by the cover plate 105. The accumulated water enters the main pipe 201 and is blocked by the baffle component 202, avoiding entry into the debris collection component 3. When the accumulated water flows through the screen plate 203, a diameter of a pore of the screen plate 203 is smaller than the filter assembly 107, again filtering the stones in the accumulated water. Flexible debris such as plastic wrapped around the screen plate 203 may be cleaned up by the cleaning assembly 204, and after filtering, large pieces of debris in the accumulated water are filtered out, leaving sediment unfiltered. The sediment sinks through the storage hopper 401, and after accumulating for a period of time, the plurality of lifting columns 403 may be controlled to extend to lift the stopper 404, allowing the sludge to flow through the slits to the sludge pipe 405. Then, the plurality of lifting columns 403 may be controlled to retract, causing the stopper 404 to block a pipe opening, and the spiral blade 406 may be opened to transport the sludge to the debris collection component 3. When cleaning is needed in the collection tank 303, the baffle cylinder 304 of the debris collection component 3 may be opened to align with the cleaning port 3013 of the collection bucket 301. Then, the vertical telescopic column 302 may be controlled to drive the collection tank 303 upward. When the collection tank 303 reaches the level of the cleaning port 3013, excess water in the collection tank 303 is filtered out through dense holes on the baffle cylinder 304. By controlling the rotating ring 305 to rotate, the cleaning plate 306 pushes the debris in the collection tank 303 outward, facilitating manual cleaning of the cleaning port 3013 to collect the debris.

Figure 7:
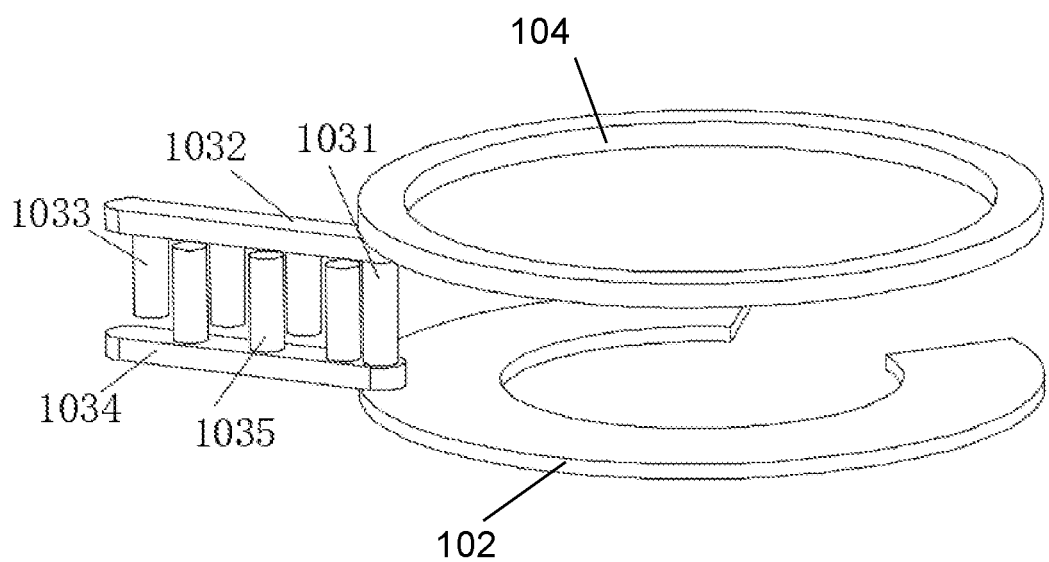
FIG. 7 is a schematic structural diagram illustrating a clearance assembly according to some embodiments of the present disclosure.

FIG. 7 is a schematic structural diagram illustrating a clearance assembly according to some embodiments of the present disclosure.

In some embodiments, the clearance assembly 103 may be used to remove larger debris near a leakage outlet. In some embodiments, the clearance assembly 103 may include a mounting cylinder 1031, which may be vertically disposed between the mounting collar 104 and the water inlet nozzle 102.

In some embodiments, an upper driving motor may be disposed at a top end of an interior of the mounting cylinder 1031, and an output shaft of the upper driving motor may be disposed upwardly, extending into the mounting collar 104 and rotationally mounted with the mounting collar 104. The output shaft of the upper driving motor may be fixedly connected to an upper rotating plate 1032 via various connection manners to drive the upper rotating plate 1032 to rotate. A plurality of first toggle columns 1033 may be disposed at equal intervals along a length direction of the upper rotating plate.

In some embodiments, a lower driving motor may be provided at a bottom end of the interior of the mounting cylinder 1031, and an output shaft of the lower driving motor may be disposed downwardly, extending into the water inlet nozzle 102 and rotationally mounted with the water inlet nozzle 102. The output shaft of the lower driving motor may be fixedly connected to a lower rotating plate 1034 via various connection manners to drive the lower rotating plate 1034 to rotate. A plurality of second toggle columns 1035 may be disposed at equal intervals along a length direction of the lower rotating plate 1034. The rotational mounting manners may include, but are not limited to, bearings, hinges, or the like.

In some embodiments, the plurality of first toggle columns 1033 and the plurality of second toggle columns 1035 are arranged in a staggered manner. During the operation of the clearance assembly 103, the upper rotating plate 1032 and the lower rotating plate 1034 rotate in opposite directions, and the first toggle columns 1033 and the second toggle columns 1035 do not collide with each other. The rotation of the upper rotating plate 1032 and the lower rotating plate 1034 enables the debris at the leakage outlet between the mounting collar 104 and the water inlet nozzle 102 to be pushed outwardly, reducing the gradual accumulation of surrounding debris, thereby ensuring smoother discharge when there is less accumulated water. The connection manners may include, but are not limited to, threaded connections, welding, or the like.

Figure 8:
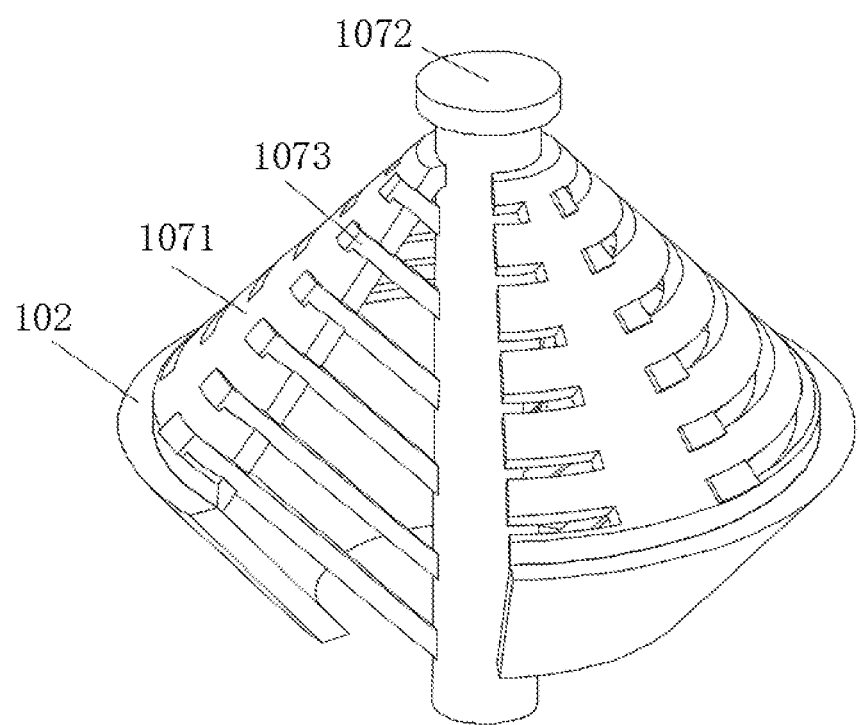
FIG. 8 is a schematic structural diagram illustrating a filter assembly according to some embodiments of the present disclosure.

FIG. 8 is a schematic structural diagram illustrating a filter assembly according to some embodiments of the present disclosure. In some embodiments, the filter assembly 107 may be used for preliminary filtration of accumulated water flowing into a leakage outlet. In some embodiments, the filter assembly 107 may include a filter plate 1071. The filter plate 1071 may be conical in shape and may also be of other shapes (e.g., cylindrical, etc.). A plurality of long strip-type slits may be provided on the filter plate 1071 along a circumferential direction of the filter plate 1071, a bottom of the filter plate 1071 may be fixedly connected to the water inlet nozzle 102, and a rotary shaft 1072 may be rotationally mounted at a mid-axis position of the filter plate 1071. One end (e.g., a bottom end) of each of the plurality of cleaning rods 1073 may be uniformly and fixedly connected to an outer wall of the rotary shaft 1072, while the other end of each of the plurality of cleaning rods 1073 may be located in the silt of the filter plate 1071. The rotation of the rotary shaft 1072 drives the plurality of cleaning rods 1073 to move back and forth in the slits of the filter plate 1071, preventing soil from blocking the filter plate 1071, thus affecting the filtration speed and accelerating the drainage of accumulated water.

Figure 9:
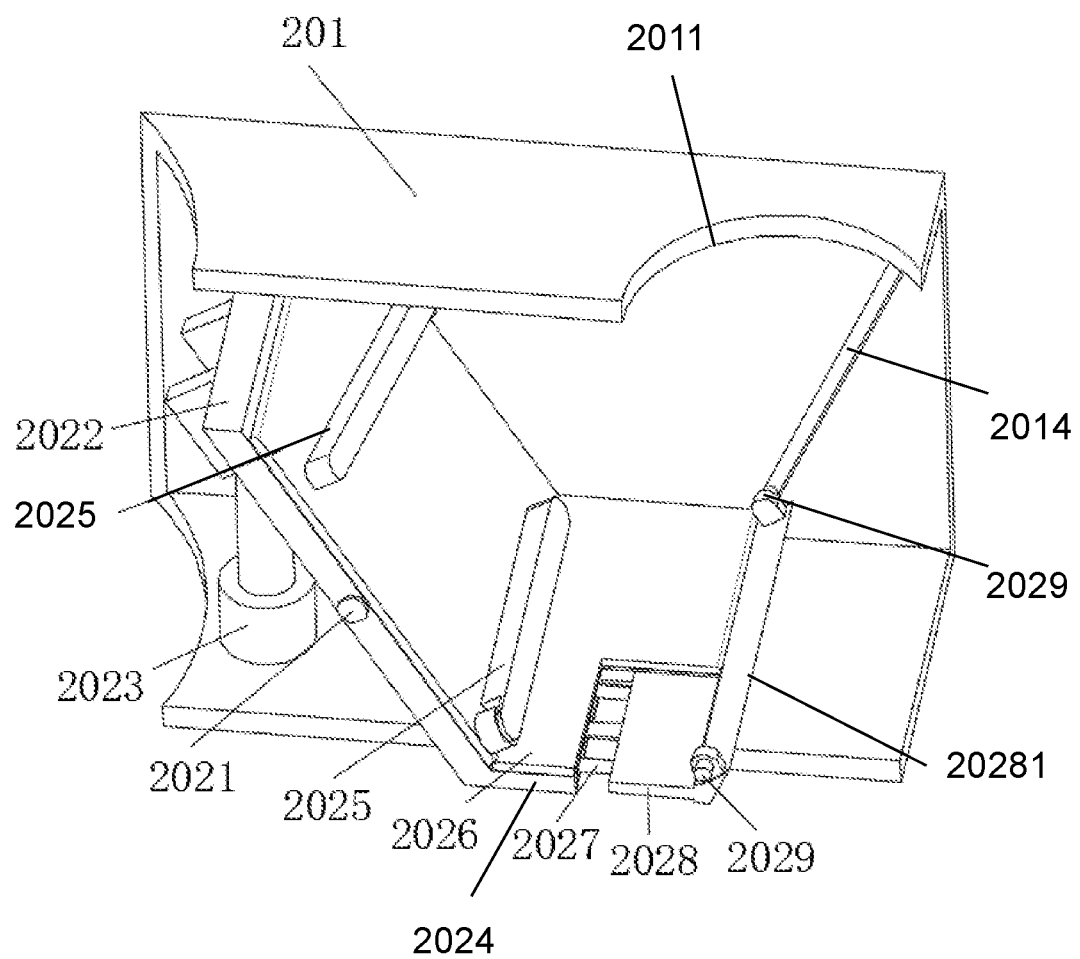
FIG. 9 is a schematic structural diagram illustrating a baffle component according to some embodiments of the present disclosure.

FIG. 9 is a schematic structural diagram illustrating a baffle component according to some embodiments of the present disclosure. In some embodiments, the baffle component 202 may include a baffle plate 2022, the baffle plate 2022 being rotationally mounted in the main pipe 201 through a transversely arranged central rod 2021, i.e., two ends of the central rod 2021 are rotationally mounted on the main pipe 201. A back side of the baffle plate 2022 may be equipped with a lifting actuator 2023, and the baffle plate 2022 is capable of rotating around the central rod 2021 by controlling the lifting actuator 2023, wherein the back side refers to the side of the baffle plate 2022 near the debris collection component. The transverse arrangement refers to arranging in a direction parallel to the side of the baffle plate 2022 near the screen plate 203.

In some embodiments, a plurality of scraper rods 2025 may be provided on a front side of the baffle plate 2022, wherein the front side refers to the side of the baffle plate 2022 proximate to the inlet connection port 2011. The plurality of scraper rods 2025 may be driven by a motor, by which the plurality of scraper rods 2025 are able to scrape away debris adhering to a surface of the baffle plate 2022 (e.g., the plurality of scraper rods 2025 may be rotated against the front side of the baffle plate 2022 under the drive of the motor).

In some embodiments, a bottom of the baffle plate 2022 may have a section of a bottom plate 2024, and a movable scraper 2028 may be provided at an end of the bottom plate 2024. The movable scraper 2028 may be connected to the bottom plate 2024 by a row of telescopic rods 2027. An end of the movable scraper 2028 away from the bottom plate 2024 is a scraping head 20281. In some embodiments, the movable scraper 2028 may slide relative to a surface of the screen plate 203. For example, two sliders 2029 may be provided on two sides of the scraping head 20281 respectively, and each of the two sliders 2029 may be slidably mounted in a sliding channel 2014 on an inner wall of the main pipe 201, the sliding channel 2014 may be inclined at an angle that is the same as an inclination angle of the screen plate 203. When debris coming in from the inlet connection port 2011 reaches a certain amount between the baffle plate 2022 and the screen plate 203, the lifting actuator 2023 may be controlled to lower down, opening the baffle plate 2022. During the opening of the baffle plate 2022, the bottom plate 2024 of the baffle plate 2022 moves upward, leading the scraping head 20281 to ascend along the sliding channel 2014. The scraping head 20281 scrapes away debris adhering to the surface of the screen plate 203, thereby reducing the impact of debris adhesion on the drainage speed of accumulated water.

In some embodiments, an upper pad 2026 may be provided on an upper surface of the bottom plate 2024 of the baffle plate 2022, and the movable scraper 2028 may be in a sliding fit with the upper pad 2026. When the movable scraper 2028 slides, the upper pad 2026 is able to cover a gap between the movable scraper 2028 and the bottom plate 2024, preventing debris from entering the gap.

Figure 10:
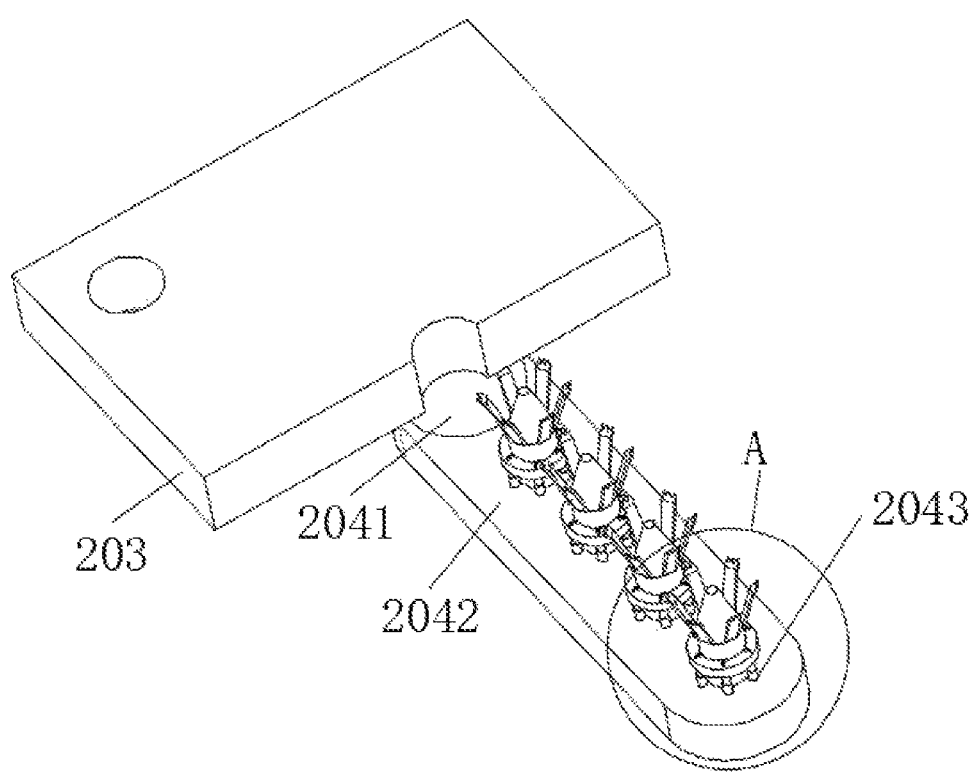
FIG. 10 is a schematic structural diagram illustrating a cleaning assembly according to some embodiments of the present disclosure.
Figure 11:
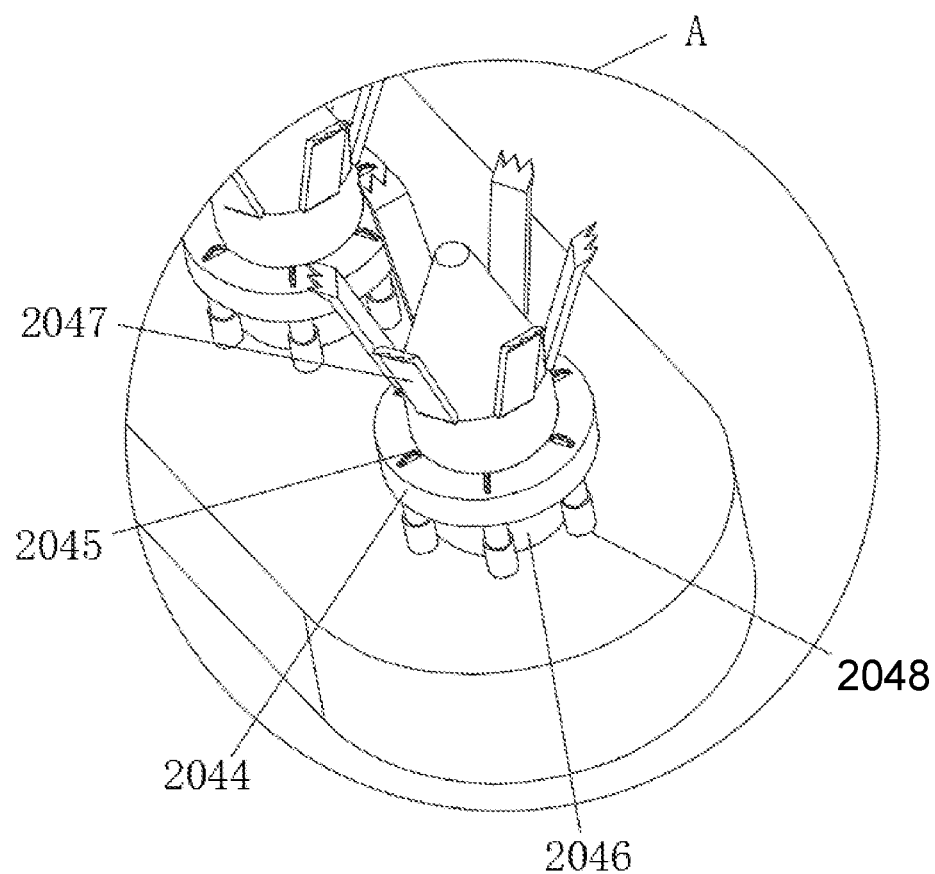
FIG. 11 is a schematic structural diagram illustrating an exemplary structure of region A in FIG. 10 according to some embodiments of the present disclosure.

FIG. 10 is a schematic structural diagram illustrating a cleaning assembly according to some embodiments of the present disclosure, and FIG. 11 is a schematic structural diagram illustrating an exemplary structure of region A in FIG. 10 according to some embodiments of the present disclosure. In some embodiments, the cleaning assembly 204 may include a motor 2041, which may be connected to a rotating plate 2042, and the rotating plate 2042 may be provided with a plurality of scraping brushes 2043. When the cleaning assembly 204 operates, the rotating plate 2042 is driven to rotate by the motor 2041, and the plurality of scraping brushes 2043 on the rotating plate 2042 clean debris adhering to a back of the screen plate 203.

In some embodiments, as shown in FIG. 11, each of the plurality of scraping brushes 2043 may include a central shaft 2046, a mounting ring 2044, a plurality of cutting knives 2045, a plurality of brush heads 2047, and a connecting column 2048, with the central shaft 2046 rotationally mounted (e.g., by bearings, hinges, etc.) on the rotating plate 2042. The plurality of the brush heads 2047 may be uniformly disposed at a top of the central shaft 2046, the mounting ring 2044 may be sleeved at a periphery of the central shaft 2046. The mounting ring 2044 may be fixed to the rotating plate 2042 through the connecting column 2048, and the plurality of the cutting knives 2045 may be uniformly disposed on the mounting ring 2044. Long strip-shaped flexible debris may hang on the screen plate 203, which is not easily washed away by water flow and may cause blockages if accumulated for a long time. When the rotating plate 2042 rotates, the plurality of brush heads 2047 are in contact with the screen plate 203, and the plurality of brush heads 2047 have a degree of rotational freedom under an action of the central shaft 2046, which enables the brush heads 2047 to rotate freely. When the brush heads 2047 rotate, they undergo relative displacement with respect to the cutting knives 2045 on the mounting ring 2044, which in turn, causes the cutting knives 2045 to cut through the debris, allowing the debris to be washed away with the water flow without accumulation and blockages, thereby enhancing the flow velocity of accumulated water.

Figure 12:
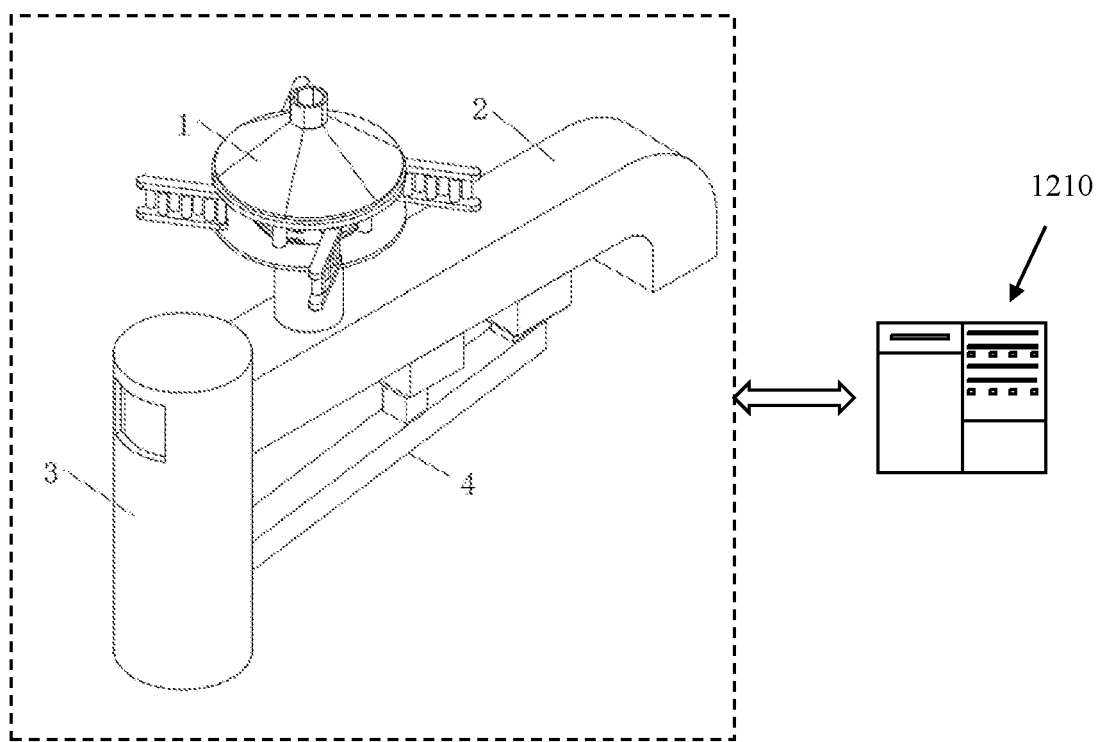
FIG. 12 is a schematic structural diagram illustrating a blockage-proof water diversion and drainage device for highway tunnel construction according to some embodiments of the present disclosure.

FIG. 12 is a schematic structural diagram illustrating a blockage-proof water diversion and drainage device for highway tunnel construction according to some embodiments of the present disclosure.

As shown in FIG. 12, the blockage-proof water diversion and drainage device for highway tunnel construction (hereinafter referred to as the water diversion and drainage device) may include an environmental water accumulation monitoring device (not shown in the drawings), an inlet water volume monitoring device (not shown in the drawings), a first outflow volume monitoring device (not shown in the drawings), a second outflow volume monitoring device (not shown in the drawings), and a processor 1210.

The environmental water accumulation monitoring device refers to a device for monitoring accumulated water in an environment in which the water diversion and drainage device is located. For example, the environmental water accumulation monitoring device may include a sludge concentration detector, a slurry laser particle size analyzer, or the like.

In some embodiments, the environmental water accumulation monitoring device may be deployed in an environment in which the water diversion and drainage device is located. For example, the environmental water accumulation monitoring device may be deployed in a location region of the water diversion and drainage device (e.g., the environmental water accumulation monitoring device may be deployed to a side of the water diversion and drainage device, or deployed on the mounting collar 104 of the inlet cleaning component 1). The environmental water accumulation monitoring device may detect accumulated water in the environment of the region in which it is located, obtaining water accumulation data and accumulated water composition data. More descriptions regarding the inlet cleaning component 1 may be found in FIG. 1 and the related descriptions thereof. More descriptions regarding the water accumulation data and the accumulated water composition data may be found in the related descriptions below.

The location region of the environmental water accumulation monitoring device refers to a region covering a location of the environmental water accumulation monitoring device and a certain distance (e.g., 5 m, 10 m, etc.) around the location of the water diversion and drainage device. In some embodiments, the location region may be a geographical area of a regular shape (e.g., a circle, a rectangle, a triangle, etc.). In some embodiments, the location region may be a geographic area of an irregular shape (e.g., an irregular polygon). Merely by way of example, the location region may be a circular area centered on the water diversion and drainage device and with a preset distance as a radius.

In some embodiments, a size of the location region may be a system default value, a manually set value, or determined based on actual situations.

The inlet water volume monitoring device is a device or system for monitoring a flow of accumulated water into the inlet cleaning component 1. For example, the inlet water volume monitoring device may include a flow sensor such as an ultrasonic flow meter, a turbine flow meter, a thermal flow meter, or the like.

In some embodiments, the inlet water volume monitoring device may be deployed at a leakage outlet between the mounting collar 104 and the water inlet nozzle 102 of the inlet cleaning component 1 for collecting data on the amount of inlet water flowing into the inlet cleaning component 1. The inlet water volume data is used to characterize a flow of accumulated water entering the inlet cleaning component 1 over a period of time.

In some embodiments, the inlet water volume monitoring device may acquire water flow data in a variety of feasible ways including, but not limited to, continuous acquisition, timed acquisition, or the like. The inlet water volume monitoring device may be communicatively connected to the processor 1210 and send the detected inlet water volume data in real time to the processor 1210.

The first outflow volume monitoring device refers to a device or system for monitoring a flow of accumulated water into the diversion component 2. For example, the first outflow volume monitoring device may include a flow sensor such as an ultrasonic flow meter, a turbine flow meter, a thermal flow meter, or the like.

More descriptions regarding the diversion component 2 may be found in FIG. 4 and the related descriptions thereof.

In some embodiments, the first outflow volume monitoring device may be deployed at the inlet connection port 2011 of the diversion component 2 for collecting data (i.e., first outflow volume data) on a flow of water that enters from the water inlet nozzle 102 and passes through the water inlet pipe 101 into the diversion component 2. More descriptions regarding the first outflow volume data may be found in FIG. 12 and the related descriptions thereof.

The second outflow volume monitoring device refers to a device or system for monitoring a flow of accumulated water discharged from the diversion component 2. For example, the second outflow volume monitoring device may include a flow sensor such as an ultrasonic flow meter, a turbine flow meter, a thermal flow meter, or the like.

In some embodiments, the second outflow volume monitoring device may be deployed at an outlet of the diversion component 2 for collecting data (i.e., second outflow volume data) on a flow of water discharged from the diversion component 2. More descriptions regarding the second outflow volume data may be found in FIG. 12 and the related descriptions thereof.

The processor 1210 refers to a system with computing capabilities, such as a computer, an industrial computer, a computing cloud platform, or the like. In some embodiments, the processor 1210 may include one or more sub-processors. For example, the processor 1210 may include a central processing unit (CPU), a graphics processing unit (GPU), etc., or any combination thereof.

In some embodiments, the processor 1210 may obtain data and/or information from the environmental water accumulation monitoring device, the inlet water volume monitoring device, the first outflow volume monitoring device, the second outflow volume monitoring device, etc., of the water diversion and drainage device. The processor 1210 may execute program instructions based on the data, information, and/or processing results to perform one or more functions described in the embodiments of the present disclosure.

In some embodiments, the processor 1210 may be communicatively connected with the environmental water accumulation monitoring device, the inlet water volume monitoring device, the first outflow volume monitoring device, the second outflow volume monitoring device, etc., respectively, to obtain the water accumulation data, the accumulated water composition data, the inlet water volume data, the first outlet volume data, and the second outlet volume data.

In some embodiments, the water diversion and drainage device may include a network and/or other components that are connected to external resources. The processor 1210 may obtain data and/or information related to the water diversion and drainage device via the network.

In some embodiments, the water diversion and drainage device may further include a user terminal. The user terminal refers to one or more terminal devices used by a user, and the processor 1210 may be integrated into the user terminal. The user refers to a manager, an operator, etc., of the water diversion and drainage device.

In some embodiments, the user terminal may include a mobile device, a tablet computer, a laptop computer, other devices with input and/or output capabilities, etc., or any combination thereof.

In some embodiments, the water diversion and drainage device may further include a storage module (not shown in the drawings), which may be used to store data, instructions, and/or any other information. For example, the storage module may store the water accumulation data, the accumulated water composition data, the first outflow volume data, the second outflow volume data, or the like. In some embodiments, the storage module may include random access memory (RAM), read-only memory (ROM), mass memory, removable memory, volatile read/write memory, or the like, or any combination thereof. In some embodiments, the storage module may be integrated or included in one or more other components (e.g., the processor 1210, the environmental water accumulation monitoring device, the inlet water volume monitoring device, the first outflow volume monitoring device, the second outflow volume monitoring device, etc.) of the water diversion and drainage device.

In some embodiments, the processor 1210 may determine, based on the water accumulation data, the accumulated water composition data, the inlet water volume data, the first outflow volume data, and the second outflow volume data, whether the water diversion and drainage device is blocked and a location of the blockage.

The water accumulation data is data related to accumulated water in an environment in which the water diversion and drainage device is located. For example, the water accumulation data may include at least one of a depth of the accumulated water, a flow velocity of the accumulated water, or the like.

The depth of the accumulated water is used to characterize a depth of the accumulated water in the location region of the water diversion and drainage device. The flow velocity of the accumulated water is used to characterize a volume or a mass of the accumulated water flowing through the location region of the water diversion and drainage device over a period of time. For example, the flow velocity of the accumulated water is $A_1$ cubic meters per second or $A_1$ liters per second.

The accumulated water composition data is data reflecting the content or concentration of various substances in the accumulated water. For example, the accumulated water composition data includes the content or concentration of various chemicals, dissolved gases, suspended solids, microorganisms, or the like in the accumulated water.

In some embodiments, the accumulated water composition data may include sludge particle size, sludge content, or the like in the accumulated water.

The sludge particle size is used to characterize the diameter of sludge particles in the accumulated water.

The sludge content is used to characterize the amount of solids in the accumulated water. For example, the sludge content may include a percentage or ratio of solids in the accumulated water.

In some embodiments, the processor 1210 may obtain the water accumulation data and the accumulated water composition data via the environmental water accumulation monitoring device in various feasible ways, including, but not limited to, continuous acquisition, timed acquisition, or the like. For example, the environmental water accumulation monitoring device may be communicatively connected to the processor 1210 and send the detected water accumulation data and accumulated water composition data to the processor 1210 in real time.

The first outflow volume data is data used to characterize the flow of accumulated water into the diversion component 2.

In some embodiments, the processor 1210 may obtain the first outflow volume data via the first outflow volume monitoring device in various feasible ways, including, but not limited to, continuous acquisition, timed acquisition, or the like. The first outflow volume monitoring device may be communicatively connected to the processor 1210 and send the detected first outflow volume data to the processor 1210 in real time.

The second outflow volume data is used to characterize the flow of accumulated water out of the diversion component 2. In some embodiments, the processor 1210 may obtain the second outflow volume data via the second outflow volume monitoring device 1230 in a variety of feasible ways, including, but not limited to, continuous acquisition, timed acquisition, or the like. The second outflow volume monitoring device may be communicatively connected to the processor 1210 and send the detected second outflow volume data to the processor 1210 in real time.

In some embodiments, the environmental water accumulation monitoring device may upload the detected water accumulation data and the accumulated water composition data to the storage module for storage. The inlet water volume monitoring device may upload the detected inlet water volume data to the storage module for saving. The first outflow volume monitoring device may upload the detected first outflow volume data to the storage module for storage. The second outflow volume monitoring device may upload the detected second outflow volume data to the storage module for storage. The processor 1210 may actively (e.g., in real time, at intervals, or triggered under certain circumstances) obtain the water accumulation data, the accumulated water composition data, the inlet water volume data, the first outflow volume data, and the second outflow volume data from the storage module under certain circumstances.

Accumulated water flows from the inlet cleaning component 1 into the diversion component 2, and both the inlet cleaning component 1 and the diversion component 2 have filtering devices such as the filter assembly 107, the screen plate 203, or the like. If the filtration devices are not cleaned in time, it may lead to blockage in the inlet cleaning component 1 or the diversion component 2, resulting in reduced water flow after blockage. Therefore, monitoring the water flow of the inlet cleaning component 1 or the diversion component 2 may determine whether a blockage occurs and a location of the blockage.

In some embodiments, the processor 1210 may determine whether a blockage occurs and the location of the blockage based on the water accumulation data, the accumulated water composition data, the inlet water volume data, the first outflow volume data, the second outflow volume data, and a preset condition.

The location of the blockage may include the inlet cleaning component 1, the diversion component 2, or the like.

The preset condition is a condition used for determining whether or not a blockage occurs.

In some embodiments, the preset condition may include a ratio of the first outflow volume data to the inlet water volume data being less than a first threshold value, and the processor 1210 may determine that a blockage occurs in response to determining that the ratio of the first outflow volume data to the inlet water volume data is less than the first threshold value and the location of the blockage is within the inlet cleaning component 1.

In some embodiments, the preset condition may include a ratio of the second outflow volume data to the first outflow volume data being less than a second threshold value. The processor 1210 may determine that a blockage occurs and that the location of the blockage is within the diversion component 2 in response to determining that the ratio of the second outflow volume data to the first outflow volume data is less than the second threshold.

The first threshold value refers to a minimum threshold condition for the ratio of the first outflow volume data to the inlet water volume data.

The second threshold refers to a minimum threshold condition for the ratio of the second outflow volume data to the first outflow volume data.

The first threshold and the second threshold may be default system values, system preset values, or values determined based on experimentation or experience.

In some embodiments, the processor 1210 may generate a first retrieval vector based on the water accumulation data, the accumulated water composition data, and the inlet water volume data, search a first database based on the first retrieval vector, and determine a first reference vector that meets a matching condition. The processor 1210 may further determine the first reference vector that meets the matching condition as a first target vector and determine a historical first threshold value and a historical second threshold value corresponding to the first target vector as the first threshold value and the second threshold value respectively.

The matching condition refers to a condition for determining the first target vector. The matching condition may include a vector distance from the first retrieval vector being less than a distance threshold, the vector distance being minimized, or the like. The vector distance may be a Euclidean distance, a cosine distance, or the like.

The first database is a database for storing, indexing, and querying vectors. The first database may store a plurality of first reference vectors and the historical first threshold and historical second threshold corresponding to each of the plurality of first reference vectors. In some embodiments, the first database may be constructed based on historical data. For example, the processor 1210 may use historical water accumulation data, historical accumulated water composition data, historical inlet water volume data from actual occurrences of blockages in the inlet cleaning component 1 and the diversion component 2 as the first reference vectors. The ratio of the historical first outflow volume data to the historical inlet water volume data corresponding to each first reference vector may be determined as the historical first threshold value, and the ratio of the historical second outflow volume data to the historical first outflow volume data corresponding to each first reference vector may be determined as the historical second threshold value.

In some embodiments, the processor 1210 may determine, based on the water accumulation data, the accumulated water composition data, the first outflow volume data, and the second outflow volume data, whether a blockage occurs and the location of the blockage using a blockage determination model. More descriptions regarding the blockage determination model may be found in FIG. 13 and the related descriptions thereof.

In some embodiments, in response to determining that a blockage of the inlet cleaning component 1 occurs, the processor 1210 may generate a filter plate cleaning instruction based on a preset acceleration magnitude and send the filter plate cleaning instruction to a shaft motor (not shown in the drawings) to control the power driving the rotation of the rotary shaft 1072.

The preset acceleration magnitude refers to a parameter for accelerating a rotational velocity of the rotary shaft 1072. For example, the preset acceleration magnitude may include an amount of change in the rotation of the rotary shaft 1072 before and after acceleration.

In some embodiments, the preset acceleration magnitude may be a system default value, a system preset value, or a value determined based on experience or experimentation.

The filter plate cleaning instruction refers to an instruction related to increasing the velocity of the shaft motor. For example, the filter plate cleaning instruction may include adjusting a parameter such as voltage/current/power of the shaft motor.

In some embodiments, the processor 1210 may determine different preset acceleration magnitudes and corresponding filter plate cleaning instructions based on historical production experience to establish a preset table, and determine a current filter plate cleaning instruction by looking up the preset table. The processor 1210 may send the filter plate cleaning instruction to the shaft motor, control the operation of the shaft motor, and regulate the rotational velocity of the rotary shaft 1072.

The shaft motor is a device that drives the rotary shaft 1072 to rotate. In some embodiments, the rotary shaft 1072 may be connected to an output shaft of the shaft motor. For example, the shaft motor may include an AC motor, etc.

In some embodiments, the filter plate cleaning instruction may include a velocity increase magnitude.

The velocity increase magnitude is a term used to reflect an increase in the velocity of the shaft motor. In some embodiments, the velocity increase magnitude may include an increase in the velocity of the shaft motor per unit time. The velocity of the shaft motor is the angular velocity at which the shaft motor rotates per unit time. The unit time may be a system default value, a system preset value, etc. By increasing the velocity of the shaft motor through the velocity increase magnitude, and thereby increasing the rotational velocity of the rotary shaft 1072, the cleaning efficiency of the cleaning rod can be improved.

In some embodiments, the shaft motor may be communicatively connected to the processor 1210, and the processor 1210 may send the filter plate cleaning instruction to the shaft motor to control a corresponding power adjustment of the shaft motor, thereby driving the rotary shaft 1072 to rotate. An amount of power adjustment of the shaft motor may be determined based on the velocity increase magnitude. Different velocity increase magnitudes correspond to different power adjustment amounts, and the correspondences may be preset.

In some embodiments of the present disclosure, it is important to clean the filter assembly in a timely manner in order to minimize fuel consumption, extend the service life of the water diversion and drainage device, and protect the rotary motor. This is achieved by preventing impurities from accumulating on the filter plate and by maintaining the purification efficiency of the filter assembly.

In some embodiments of the present disclosure, monitoring the amount of the accumulated water may enable the determination of whether a blockage occurs and the location of the blockage, facilitating subsequent troubleshooting and repair. For example, after a blockage occurs, manual intervention may be employed to address the blockage, or a self-clearing device (e.g., the cleaning assembly 204 or the baffle component 202) may be activated to address the blockage, thereby improving the reliability of the water diversion and drainage device.

Figure 13:
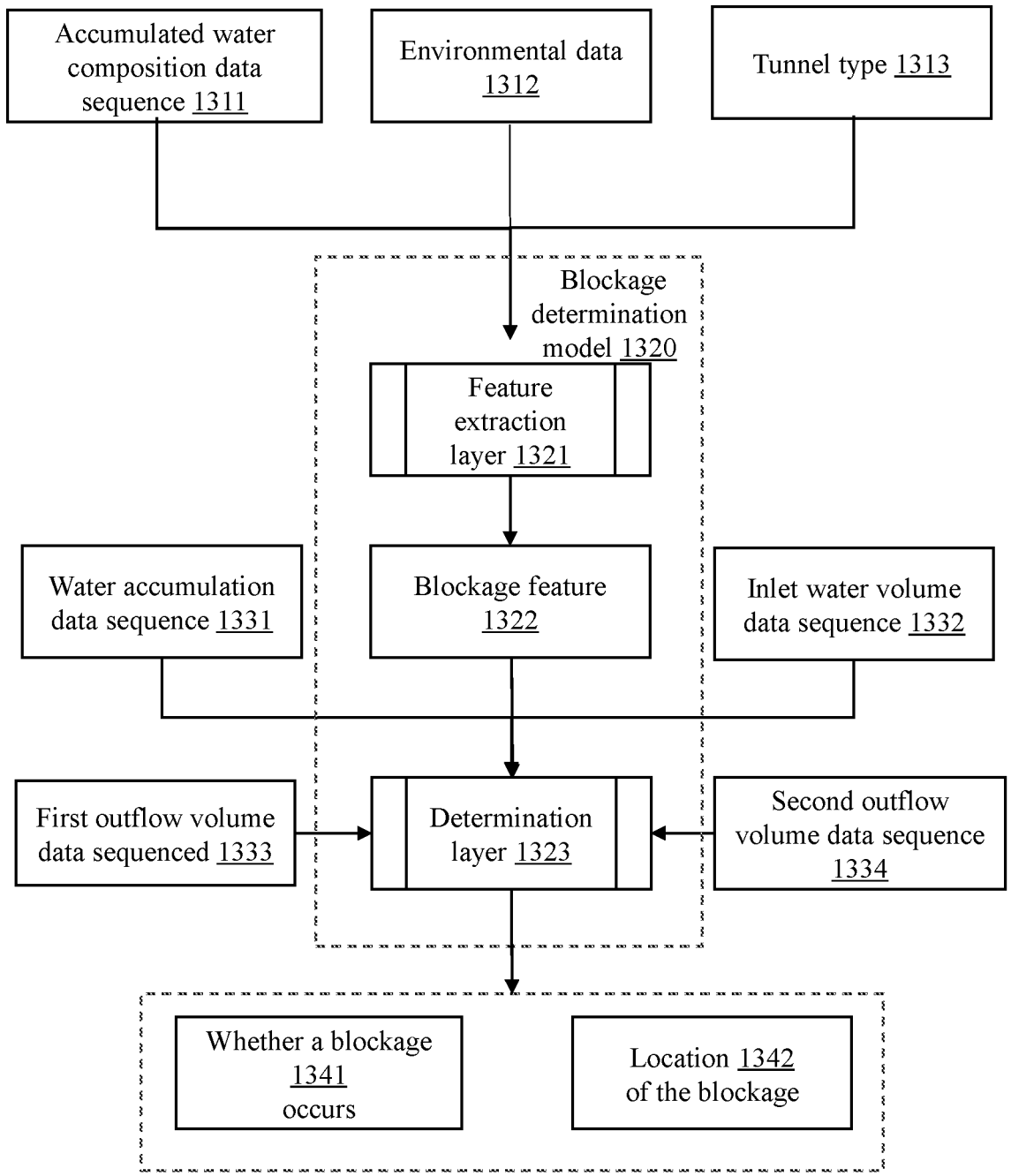
FIG. 13 is a flowchart illustrating a blockage determination model according to some embodiments of the present disclosure.

FIG. 13 is a flowchart illustrating a blockage determination model according to some embodiments of the present disclosure.

In some embodiments, as shown in FIG. 13, the processor 1210 may determine, based on water accumulation data, accumulated water composition data, first outflow volume data, and second outflow volume data, whether a blockage 1341 occurs and a location 1342 of the blockage using a blockage determination model 1320.

The blockage determination model is a model for determining whether a blockage occurs and the location of the blockage. In some embodiments, the blockage determination model 1320 may be a machine learning model. For example, the blockage determination model 1320 may be a machine learning model with a custom structure as described below. The blockage determination model 1320 may also be a machine learning model of another structure, for example, a recurrent neural network (RNN) model, a neural network (NN) model, or a combination thereof.

In some embodiments, the blockage determination model 1320 may include a feature extraction layer 1321 and a determination layer 1323.

The feature extraction layer 1321 may be used to extract a blockage feature 1322. In some embodiments, the feature extraction layer 1321 may be a recurrent neural network (RNN) model. An input of the feature extraction layer 1321 may include an accumulated water composition data sequence 1311, environmental data 1312, a tunnel type 1313, and an output of the feature extraction layer 1321 may include the blockage feature 1322.

The accumulated water composition data sequence 1311 refers to a sequence composed of accumulated water composition data collected by environmental water accumulation monitoring devices deployed at different preset locations. The preset location refers to a location where the accumulated water diversion and drainage device (e.g., the environmental water accumulation monitoring device) is installed. For example, the preset point location may be any location in an environment in which the accumulated water diversion and drainage device (e.g., the accumulated water diversion and drainage device) is installed. As another example, the preset point locations may be a plurality of locations evenly spaced around the water diversion and drainage device.

The environmental data 1312 refers to data about the environment in which the water diversion and drainage device is located. The environmental data 1312 may include seasonal data, weather data (e.g., precipitation, wind), or the like for the environment in which the water diversion and drainage device is located. The seasonal data, the weather data, etc., may affect an amount of debris (e.g., leaves) in accumulated water. In some embodiments, the processor 1210 may obtain the environmental data 1312 via an environmental sensor deployed in the environment in which the water diversion and drainage device is located. For example, the environmental sensor may include a temperature sensor, a humidity sensor, or the like. As another example, the environmental sensor may include a light sensor, a wind speed and direction sensor, or the like. In some embodiments, the processor 1210 may obtain the weather data through a third-party platform, such as a weather forecasting website.

The tunnel type 1313 refers to classification result of tunnels. For example, the tunnel type 1313 may include a transportation tunnel, a hydraulic tunnel, a municipal tunnel, a mining tunnel, or the like. In some embodiments, the processor 1210 may obtain the tunnel type 1313 through manual input or from memory storage.

The blockage feature 1322 is used to reflect a degree of blockage of the water diversion and drainage devices. For example, the degree of blockage of water diversion and drainage device is greater in a tunnel of the tunnel type 1313 with a high sludge content, a large sludge particle size, and in a mining tunnel. The degree of blockage is used to characterize a severity level or a difficulty level of blockage. In some embodiments, the blockage feature 1322 may be expressed as a numerical value (e.g., a blockage degree, a blockage value, etc.) or a rating (e.g., a blockage rating), with a larger value or higher rating indicating a greater degree of blockage.

The determination layer 1323 may be used to determine whether a blockage occurs and the location of the blockage. In some embodiments, the determination layer 1323 may be a neural network (NN) model. In some embodiments, an input of the determination layer 1323 may include the blockage feature 1322, the accumulated water composition data sequence 1331, an inlet water volume data sequence 1332, a first outflow volume data sequence 1333, a second outflow volume data sequence 1334, and an output of the determination layer 1323 may include whether a blockage 1341 occurs and the location 1342 of the blockage.

The water accumulation data sequence 1331 refers to a sequence consisting of water accumulation data collected by environmental water accumulation monitoring devices at different preset locations.

The inlet water volume data sequence 1332 refers to a sequence consisting of inlet water volume data at different time points. For example, the inlet water volume data sequence 1332 may be a sequence consisting of inlet water volume data arranged in a chronological order.

The first outflow volume data sequence 1333 refers to a sequence consisting of first outflow volume data at different time points. For example, the first outflow volume data sequence 1333 may be a sequence consisting of first outflow volume data arranged in a chronological order.

The second outflow volume data sequence 1334 refers to a sequence consisting of second outflow volume data at different time points. For example, the second outflow volume data sequence 1334 may be a sequence consisting of second outflow volume data arranged in a chronological order.

In some embodiments, the water accumulation data sequence 1331, the inlet water volume data sequence 1332, the first outflow volume data sequence 1333, and the second outflow volume data sequence 1334 input to the determination layer 1323 may have a correspondence between them. For example, the inlet water volume data sequence 1332, the first outflow volume data sequence 1333, and the second outflow volume data sequence 1334 input to the determination layer 1323 may be obtained by collecting the data thereof at the same time points. The water accumulation data sequence 1331 may be a sequence consisting of the water accumulation data collected at a designated time point by environmental water accumulation monitoring devices deployed at different preset locations. The designated time point may be a collection time point corresponding to certain data in the inlet water volume data sequence 1332, the first outflow volume data sequence 1333, the second outflow volume data sequence 1334, etc. In other words, the water accumulation data sequence 1331 is a sequence of water accumulation data collected at the collection time point corresponding to the certain data in the inlet water volume data sequence 1332, the first outflow volume data sequence 1333, or the second outflow volume data sequence 1334.

In some embodiments, the processor may periodically acquire the inlet water volume data sequence 1332, the first outflow volume data sequence 1333, and the second outflow volume data sequence 1334, and at the most recent acquisition of the above sequence data, simultaneously acquire the water accumulation data sequence 1331, and input the sequences into the determination layer 1323 for processing, respectively. As used herein, the periodic acquisition refers to acquiring the sequence data every preset time period (e.g., 5s, 10s, etc.). The preset time may be determined by a system or human preset, etc.

In some embodiments, the blockage determination model 1320 may be obtained by training the feature extraction layer 1321 and the determination layer 1323 respectively based on a large number of training samples with labels. For example, the feature extraction layer may be obtained by training based on a large number of first training samples with a first label in a variety of feasible ways, such as gradient descent for parameter updates. An exemplary training process may include the following operations: a plurality of first training samples with first labels may be input into an initial feature extraction layer and a loss function may be constructed based on a result of the first label and the initial feature extraction layer. Based on the loss function, parameter(s) of the initial feature extraction layer may be iteratively updated using gradient descent or other techniques. The model training is completed when a preset condition is met, and a trained feature extraction layer is obtained. The preset condition may be that the loss function converges, a count of iterations reaches a threshold, etc.

In some embodiments, the first training samples may include a plurality of sets of training samples. Each set of the plurality of sets of training samples may include at least a sample accumulated water composition data sequence, sample environmental data, and a sample tunnel type. The first training samples may be obtained based on historical data. The first labels may include actual blockage features corresponding to the first training samples.

In some embodiments, the same volume of accumulated water of different types may be used as the first training samples, and experiments may be conducted on the first training samples at the same flow volume and flow velocity. Upon completing diversion of water flow, actual degrees of blockage of water diversion and drainage devices may be monitored respectively. The actual degrees of blockage corresponding to the first training samples may be designated as the actual blockage features. By way of example, a residual amount of debris within the water diversion and drainage device may be determined by manual inspection, and the blockage feature is positively correlated with the residual amount. The larger the residual amount and the larger the degree of blockage, the greater the blockage feature. By way of example, a time at which the water diversion and drainage device is blocked may be monitored, and the blockage feature may be negatively correlated with the time. The shorter the time and the greater the degree of blockage, the greater the blockage feature.

In some embodiments, the determination layer may be trained in a variety of feasible ways based on a large number of second training samples with second labels. The training of the determination layer is similar to the training of the feature extraction layer, as described in more detail in the preceding description.

In some embodiments, the second training samples may include a plurality of sets of training samples, each set of the plurality of sets of training samples including at least a sample water accumulation data sequence, a sample inlet water volume data sequence, a sample first outflow volume data sequence, and a sample second outflow volume data sequence. The second training samples may be obtained based on historical data. The second labels may include whether a blockage actually occurs in the water diversion and drainage device corresponding to the second training samples, as well as the location of the actual blockage. The second label may be obtained based on manual or automatic labeling.

In some embodiments of the present disclosure, the blockage determination model enables efficient and accurate determination of whether the water diversion and drainage device experiences a blockage and the location of the blockage, thus avoiding errors caused by manual determination based on experience and facilitating timely subsequent processing of the water diversion and drainage device.

In some embodiments, the processor 1210 may be configured to predict an accumulation rate of debris between the baffle plate 2022 and the screen plate 203, determine an opening time interval for controlling the opening of the baffle component 202 based on the accumulation rate of debris, and generate an opening instruction to control the opening of the baffle component 202 based on the opening time interval.

More descriptions regarding the baffle plate 2022 and the screen plate 203 may be found in FIGS. 4 and 9 and the related descriptions thereof.

The accumulation rate of debris refers to an amount of debris accumulated between the baffle plate 2022 and the screen plate 203 in a time period. For example, the accumulation rate of debris may include an amount or thickness of debris that accumulates between the baffle plate 2022 and the screen plate 203 per unit time.

In some embodiments, the processor may predict the accumulation rate of debris in various ways. For example, the processor may determine an accumulated water category based on an accumulated water feature using a classification algorithm. The accumulated water category refers to a category of the accumulated water feature. Different accumulated water categories correspond to different accumulation rates of debris. The accumulated water feature is data used to reflect the feature of the accumulated water. For example, the accumulated water feature may include the blockage feature, the water accumulation data, the accumulated water composition data, the inlet water volume data, or the like.

The classification algorithm refers to an algorithm for determining the accumulated water category. In some embodiments, the classification algorithm may include, but is not limited to, any one of a K-Nearest Neighbor algorithm, a decision tree, etc., or a combination thereof.

In some embodiments, the processor 1210 may obtain a correspondence between different accumulated water categories and different accumulation rates of debris based on experimental data. For example, experiments may be conducted based on accumulated water with different reference accumulated water features, and after diversion of the accumulated water is complete, an accumulation rate of debris corresponding to each reference accumulated water feature may be obtained. Exemplarily, during the experiments, the baffle plate 2022 and the screen plate 203 of the water diversion and drainage device may be configured to be visible, or a miniature monitoring device may be installed inside the water diversion and drainage device to monitor the accumulation rate of debris for different accumulated water features. The processor may cluster the different reference accumulated water features to obtain a plurality of accumulated water categories, and determine, for each of the plurality of accumulated water categories, an average accumulation rate of debris for all the reference accumulated water features as a reference accumulation rate of debris corresponding to the water accumulation category. A clustering algorithm may include, but is not limited to, K-Means clustering, density-based spatial clustering of applications with noise (DBSCAN), or the like.

The miniature monitoring device refers to a device or equipment used for obtaining information between the baffle plate 2022 and the screen plate 203. For example, the miniature monitoring device may include a miniature camera, an image sensor, or the like.

In some embodiments, the processor 1210 may determine the accumulated water category of current accumulated water based on the accumulated water feature (the blockage feature, the water accumulation data, the accumulated water composition data, the inlet water volume data, etc.) of the current accumulated water. Then the processor may designate the reference accumulation rate of debris corresponding to the accumulated water category as the accumulation rate of debris corresponding to the current accumulated water. By way of example, the processor 1210 may determine the accumulation category for the current water accumulation based on a K-Nearest Neighbor (KNN) algorithm. If there are three accumulated water categories, denoted as w1, w2, and w3, and the processor sets K=5, i.e., the processor determines five nearest neighbors based on the accumulated water feature X of the current accumulated water as the center. If among these five neighbors, four belong to category w1, none belong to w2, and one belongs to w3, then the accumulated water X is classified into category w1.

The opening time interval refers to a time interval between two consecutive activations of the baffle component 202. For example, the opening time interval may include the time between a first activation of the baffle component 202 and a second activation of the baffle component 202 after the water diversion and drainage device is powered on. The second activation of the baffle component 202 refers to the operation of activating the baffle component 202 at any time after the first activation.

In some embodiments, the processor 1210 may determine the opening time interval in multiple ways. For example, the processor 1210 may establish a correspondence between different accumulation rates of debris and different opening time intervals based on historical data, and determine the opening time interval by looking up in a table. The faster the accumulation rate of debris, the shorter the opening time interval.

The opening instruction is an instruction that controls the operation of the baffle component. For example, the opening instruction may include controlling the opening/closing of the baffle component 202, an operating time of the baffle component 202, or the like. The operating time is a duration from opening to closing of the baffle component 202 in one opening process.

In some embodiments, the processor may determine the opening instruction based on the opening time interval. The processor may control the opening of the baffle component 202 based on the opening instruction.

In some embodiments, the baffle component 202 may be communicatively connected to the processor, and the processor may send the opening instruction to the baffle component 202 to control the opening of the baffle component 202 at intervals based on the opening time interval.

In some embodiments, the processor may determine, based on the accumulation rate of debris, the accumulated water composition data, and the tunnel type 1313, an activation time interval for the lifting actuator 2023 to activate the scraping head 20281 and, based on the activation interval, generate an activation instruction to control the activation of the lifting actuator 2023.

More descriptions regarding the lifting actuator 2023 may be found in FIG. 9 and the related descriptions thereof.

The activation time interval is a time interval between two consecutive activations of the lifting actuator 2023. For example, the activation time interval may include the time interval between a first activation of the lifting actuator 2023 and a second activation of the lifting actuator 2023 after the water diversion and drainage device is powered on. More descriptions regarding the lifting actuator 2023 may be found in FIG. 9 and the related descriptions thereof.

In some embodiments, the processor may determine the activation time interval in multiple ways. For example, the processor may generate a second retrieval vector based on the accumulation rate of debris, the accumulated water composition data, and the tunnel type 1313. Then the processor may search a second database based on the second retrieval vector, determine a second reference vector that meets a retrieval condition, and determine the second reference vector that meets the retrieval condition as a second target vector. The second target vector corresponding to a second reference activation time interval may be determined as a current activation time interval.

The retrieval condition is a condition for determining the second target vector. The retrieval condition may include a vector distance from the second retrieval vector being less than a distance threshold, the vector distance being minimized, etc. The vector distance may include a Euclidean distance, a cosine distance, etc.

The second database is a database for storing, indexing, and querying vectors. The second database may store a plurality of second reference vectors and a reference activation time interval corresponding to each of the plurality of second reference vectors. In some embodiments, the second database may be constructed based on historical data. For example, the processor may use historical accumulation rates of debris, historical accumulated water composition data, and historical tunnel types as the second reference vectors, and historical activation time intervals corresponding to the second reference vectors as the reference activation time intervals.

The activation instruction is an instruction that controls the operation of the lifting actuator 2023. For example, the activation instruction may control the opening/closing of the lifting actuator 2023, the operating time of the lifting actuator 2023, or the like.

In some embodiments, the processor may generate the activation instruction based on the activation time interval. The processor may activate the lifting actuator 2023 intermittently based on the activation instruction.

In some embodiments, the lifting actuator 2023 may be communicatively connected to the processor, and the processor may send the activation instruction to the lifting actuator 2023 to control the lifting actuator 2023 to turn on at intervals based on the activation instruction.

In some embodiments of the present disclosure, an accumulated amount of debris adhered to a surface of the screen plate 203 correlates to the accumulation rate of debris and accumulated water composition, and different types of tunnels include different types of debris with different adhesion strengths. For example, mining tunnels contain more debris such as mineral dust and have a higher adhesion strength. By using different accumulated water features, targeted activation time intervals that meet actual application requirements can be obtained to improve the cleaning efficiency of the screen plate 203.

In some embodiments, the processor may activate the baffle component 202 and/or the lifting actuator 2023 in response to determining that a blockage occurs within the diversion component 2. After the baffle component 202 and/or the lifting actuator 2023 is activated, the processor may determine whether the blockage is resolved, and in response to determining that the blockage is resolved, shorten the opening time interval and/or the activation time interval based on a first preset magnitude.

The first preset magnitude is a parameter value for adjusting the opening time interval and/or the activation time interval. The first preset magnitude may be a system preset value, a system default value, etc.

In some embodiments, the first preset magnitude may include at least one of a first reduction value or a second reduction value. The first reduction value is an amount of change in the opening time interval before and after reduction. The second reduction value is an amount of change in the activation time interval before and after reduction.

In some embodiments, the processor may turn on the baffle component 202 and/or the lifting actuator 2023 in response to determining that a blockage occurs within the diversion component 2. After the baffle component 202 and/or the lifting actuator 2023 is turned on, the processor may determine in real time whether a blockage occurs in the water diversion and drainage component and a location of the blockage in a manner similar to that in FIG. 12. If a determination result is that there is no blockage, it indicates that the blockage has been cleared and the blockage problem has been resolved.

In some embodiments, the processor may shorten the opening time interval and/or the activation time interval based on the first preset magnitude while determining the resolution of the blockage problem, or at specific intervals.

It should be noted that if the blockage problem can be resolved after the baffle component 202 and/or the lifting actuator 2023 are turned on, it may indicate that the blockage occurred within the diversion component 2 is due to an excessively long opening time interval of the baffle component 202 and/or an excessively long activation time interval of the lifting actuator 2023. Therefore, the opening time interval and the activation time interval may be appropriately shortened to increase a cleaning frequency of the diversion component 2 for debris, thereby reducing the risk of blockage.

In some embodiments of the present disclosure, the baffle component and the lifting actuator and may be controlled to clean debris in the water diversion and drainage device. By adjusting the opening time interval of the baffle component and the activation time interval of the lifting actuator, the blockage problem can be resolved while reducing resource waste.

In some embodiments of the present disclosure, by determining the opening time interval of the baffle component based on the accumulation rate of debris, it is possible to more accurately predict when debris needs to be cleaned, thereby avoiding excessive or insufficient cleaning, which helps improve cleaning efficiency and the overall efficiency of the water diversion and drainage device.

In some embodiments, a weighing device (not shown in the drawings) may be deployed on the stopper 404 of the pre-storage component 4, and the weighing device may be configured to collect weight data of sediment in the storage hopper 401. The processor may, in response to determining that the weight data meets a transportation condition, control the plurality of lifting columns 403 to extend and lift the stopper 404, allowing sludge to flow through a gap to the sludge pipe.

More descriptions regarding the pre-storage component 4, the storage hopper 401, and the stopper 404 may be found in FIG. 6 and the related descriptions thereof.

The weighing device is a device or instrument used to weigh or measure the weight of the sediment in the storage hopper 401. For example, the weighing device may include a mechanical weighing device, an electronic weighing device, or the like.

In some embodiments, the weighing device may be provided on the stopper 404.

The weight data refers to a result of weighing or measuring the sediment in the storage hopper 401.

In some embodiments, the weighing device may be communicatively connected to the processor to send real-time detected weight data to the processor.

The transportation condition is a condition for evaluating whether to transport the sediment from the storage hopper 401 to the sludge pipe. For example, the transportation condition may include the weight data being greater than a transportation threshold. The transportation threshold may be a system preset value, a system default value, or the like.

In some embodiments, the processor may determine the transportation threshold based on the first outflow volume data and the second outflow volume data. For example, when there is no blockage within the diversion component, a difference between the first outflow volume data and the second outflow volume data is relatively small, and the transportation threshold may be negatively correlated with the first outflow volume data, the second outflow volume data, or an average of the first outflow volume data and the second outflow volume data; when a blockage occurs within the diversion component, causing the first outflow data to be relatively large and the second outflow data to be relatively small, the transportation threshold may be negatively correlated with the first outflow volume data or the average of the first outflow volume data and the second outflow volume data. The greater the first outflow volume data or the average of the first outflow volume data and the second outflow volume data, the greater the flow velocity of the accumulated water faster, and the smaller the transportation threshold, indicating the need to increase a frequency of transportation of the sediment in the storage hopper 401. For example, the processor may preset a preset table including average values of different first outflow volume data and second outflow volume data and different transportation thresholds based on historical production experience, and determine the transportation threshold by looking up the preset table.

In some embodiments, the processor may compare the weight data with the transportation threshold, and in response to determining that the weight data is greater than the transportation threshold, determine one or more extension parameters, generate one or more extension instructions based on the one or more extension parameters, and send the one or more extension instructions to a lifting column motor to control the plurality of lifting columns 403 to extend and lift the stopper 404, causing the sediment to flow into the sludge pipe. Different extension parameters correspond to different extension instructions.

An extension instruction is an instruction for controlling the operation of the lifting column motor. In some embodiments, the extension instruction may include a parameter for adjusting the voltage/current/power, etc., of the lifting column motor.

An extension parameter is a parameter used when the lifting column 403 extends or retracts. For example, the extension parameter may include an extension amplitude of the lifting column 403, an extension speed of the lifting column 403, a retraction amplitude of the lifting column 403, a retraction speed of the lifting column 403, or the like. The extension amplitude is an amount of extension of the lifting column 403 from a beginning to an end of an extension. The lowering amplitude is an amount of retraction of the lifting column 403 from a beginning to an end of a retraction.

In some embodiments, the processor may determine the extension amplitude of the lifting column 403 based on the weight data and a sediment inflow velocity, generate the extension instruction based on the extension amplitude, and send the extension instruction to the lifting column motor to control the lifting column 403.

More descriptions regarding the lifting column 403 may be found in FIG. 6 and the related descriptions thereof.

The sediment inflow velocity is a velocity at which sediment flows from the storage hopper 401 into the sludge pipe.

In some embodiments, the sediment inflow velocity may include a change in the weight data of the sediment per unit time. The processor may determine the sediment inflow velocity based on a rate of change of the weight data of the sediment.

The lifting column motor is a device used to drive the lifting column 403 to extend or retract.

In some embodiments, the processor may determine the extension amplitude of the lifting column 403 in a variety of ways based on the weight data and the sediment inflow velocity. For example, the processor may determine, based on historical data, a correspondence between different weight data, different sediment inflow velocities, and determine the extension amplitude of the lifting column 403 by looking up a table. As another example, the processor may determine the extension amplitude of the lifting column 403 based on a preset rule. For example, the larger the weight data and the slower the sediment inflow velocity, the greater the extension amplitude of the lifting column 403.

In some embodiments, the lifting column motor may be communicatively connected to the processor, and the processor may send the extension instruction to the lifting column motor to control extension of the lifting column 403 based on the extension amplitude.

In some embodiments of the present disclosure, determining different extension amplitudes based on different weight data and sediment inflow velocities can improve the efficiency of sediment cleaning and reduce the risk of sediment accumulation in the storage hopper 401.

In some embodiments, the processor may control the lifting column 403 to extend when it determines that a blockage occurs within the diversion component 2. After controlling the extension of the lifting column 403, the processor may determine whether the blockage problem is resolved and in response to determining that the blockage problem is resolved, reduce the transportation threshold based on a second preset magnitude.

The second preset magnitude is a parameter for reducing the transportation threshold. The second preset magnitude may be a system preset value, a system default value, etc.

In some embodiments, the processor may control the lifting column 403 to extend in response to determining that a blockage occurs within the diversion component 2. After the lifting column 403 extends, the processor may determine in real time, in a manner similar to that of FIG. 12, whether a blockage occurs in the water diversion and drainage device and a location of the blockage. If a determination result indicates no blockage, it means the blockage has been cleared, and the blockage problem is resolved.

In some embodiments, the processor may reduce a magnitude of the transportation threshold based on the second preset magnitude when the processor determine that the blockage problem has been resolved, or at specific intervals.

It should be noted that if the blockage problem can be resolved by extending the lifting column 403, it indicates that the transportation condition is excessively harsh. Therefore, it may be appropriate to reduce the magnitude of the transportation threshold, increase a frequency of extension of the lifting column 403, improve the cleaning frequency of the water diversion and drainage device for sediment, and reduce the risk of blockage.

In some embodiments of the present disclosure, by reducing the magnitude of the transportation threshold and controlling the frequency of extension of the lifting column, timely cleaning of sediment in the storage hopper can effectively avoid blockage problems.

In some embodiments of the present disclosure, the weighing device may be used to monitor the weight of the sediment in the storage hopper in real time, so as to reduce the blockage in the main pipe caused by excessive sediment and avoid the accumulation of sediment that may affect the normal operation of the water diversion and drainage device, reduce its drainage efficiency, and even lead to blockage. Timely cleaning can ensure the smooth operation of the water diversion and drainage device, enabling it to operate normally and effectively.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A blockage-proof water diversion and drainage device for highway tunnel construction, comprising:
   an inlet cleaning component, a diversion component connected to a bottom of the inlet cleaning component, a debris collection component connected to an end of the diversion component close to the inlet cleaning component, a pre-storage component connected to a bottom of the diversion component, and an outlet end of the pre-storage component is connected to the debris collection component, wherein the inlet cleaning component includes a water inlet pipe, a water inlet nozzle is fixedly connected to a top of the water inlet pipe, a plurality of clearance assemblies are connected to a top of the water inlet nozzle, a mounting collar is fixedly connected to a top of the plurality of clearance assemblies, a plurality of openable cover plates are arranged around a top of the mounting collar in a circular pattern, a hydraulic rod is provided between the water inlet nozzle and each of the plurality of openable cover plates and is used to control the opening or closing of the cover plate, a filter assembly is fixedly connected to the water inlet nozzle;

the diversion component includes a main pipe, an inlet connection port is provided on a top of the main pipe, the inlet connection port is connected to the water inlet pipe; one end of the main pipe is connected to the debris collection component, and an openable baffle component is provided in an internal passage between the inlet connection port of the main pipe and the debris collection component, the openable baffle component is used for controlling a communication state between the main pipe and the debris collection component; a screen plate is provided on an inner wall of the inlet connection port of the main pipe on a side away from the baffle component;

the pre-storage component includes one or more storage hoppers, the one or more storage hoppers are connected to the main pipe, a bottom of each of the one or more storage hoppers is connected to a sludge pipe, an outlet end of the sludge pipe is connected to the debris collection component; one or more spiral blades are rotationally provided in an interior of the sludge pipe for transporting sludge to the debris collection component for centralized treatment when turned on.

2. The blockage-proof water diversion and drainage device of claim 1, wherein two deflectors are symmetrically and rotationally mounted on an inner wall of a side of the main pipe away from the screen plate, each of the two deflector is connected to a resistance plate by snap-fitting, and a spring leaf is rotationally connected between the resistance plate and the inner wall of the main pipe.

3. The blockage-proof water diversion and drainage device of claim 1, wherein a mounting plate is provided in a communication pipeline between each of the one or more storage hoppers and the sludge pipe, an outer wall of the mounting plate is fixedly connected to an inner wall of the communication pipeline, a flow-through hole is opened in a center of the mounting plate, a plurality of lifting columns are provided on the mounting plate, and a stopper is fixedly connected to a top of the plurality of lifting columns.

4. The blockage-proof water diversion and drainage device of claim 1, wherein the debris collection component includes a collection bucket, a first connection port for connecting with the main pipe, a second connection port for connecting with the sludge pipe, and a cleaning port are provided on a wall of the collection bucket; a vertical telescopic column is fixedly connected to a top of an inner wall of the collection bucket; a collection tank is fixedly connected to a bottom of the vertical telescopic column; a bottom of the collection tank is rotationally provided with a baffle cylinder, an outer wall of the vertical telescopic column near one end of the collection tank is rotationally mounted with a rotating ring, an outer wall of the rotating ring is fixedly connected with a cleaning plate, and an opening is provided on one side of the baffle cylinder.

5. The blockage-proof water diversion and drainage device of claim 1, wherein each of the plurality of clearance assemblies includes a mounting cylinder, the mounting cylinder being vertically disposed between the mounting collar and the water inlet nozzle, and an upper driving motor is disposed at a top end of an interior of the mounting cylinder, an output shaft of the upper driving motor is disposed upwardly and rotationally mounted with the mounting collar; a lower driving motor is disposed at a bottom end of the interior of the mounting cylinder, an output shaft of the lower drive motor is disposed downwardly and rotationally mounted with the water inlet nozzle; the output shaft of the upper driving motor is fixedly connected with an upper rotating plate and is capable of driving the upper rotating plate to rotate, and a plurality of vertically downwardly arranged first toggle columns are disposed at equal intervals along a length direction of the upper rotating plate; the output shaft of the lower driving motor is fixedly connected with a lower rotating plate and is capable of driving the lower rotating plate to rotate, and a plurality of vertically upwardly arranged second toggle columns are disposed at equal intervals along a length direction of the lower rotating plate; and the first toggle columns and the second toggle columns are arranged in a staggered manner.

6. The blockage-proof water diversion and drainage device of claim 1, wherein the filter assembly includes a filter plate, the filter plate is conical in shape, with a plurality of long strip-type slits provided on the filter plate along a circumferential direction of the filter plate, a bottom of the filter plate is fixedly connected to the water inlet nozzle, a rotary shaft is rotationally mounted at a mid-axis position of the filter plate, a plurality of cleaning rods are uniformly fixedly connected to an outer wall of the rotary shaft, and top ends of the cleaning rods are located in the slits of the filter plate.

7. The blockage-proof water diversion and drainage device of claim 1, wherein the baffle component includes a baffle plate, the baffle plate is rotationally mounted in the main pipe through a transversely arranged central rod, a back side of the baffle plate is equipped with a lifting actuator; a front side of the baffle plate is equipped with a plurality of scraper rods, which is capable of scraping away debris adhering to a surface of the baffle plate; a bottom of the baffle plate has a section of a bottom plate, a movable scraper is provided at an end of the bottom plate, the movable scraper is connected to the bottom plate by a row of telescopic rods, an end of the movable scraper away from the bottom plate is a scraping head, and two sliders are provided on two sides of the scraping head respectively, each of the two sliders is slidably mounted in a sliding channel on an inner wall of the main pipe, the sliding channel is provided along the screen plate.

8. The blockage-proof water diversion and drainage device of claim 7, wherein an upper pad is provided on an upper surface of the bottom plate of the baffle plate, and the movable scraper is in a sliding fit with the upper pad.

9. The blockage-proof water diversion and drainage device of claim 1, wherein a cleaning assembly is provided at a back of the screen plate, the cleaning assembly includes a motor, the motor is connected to a rotating plate, and a plurality of scraping brushes are provided on the rotating plate.

10. The blockage-proof water diversion and drainage device of claim 9, wherein each of the plurality of scraping brushes includes a central shaft, a mounting ring, a plurality of cutting knives, a plurality of brush heads, and a connecting column, the central shaft is rotationally mounted on the rotating plate, the plurality of the brush heads are uniformly disposed at a top of the central shaft, the mounting ring sleeves at a periphery of the central shaft, the mounting ring is fixed to the rotating plate through the connecting column, and the plurality of cutting knives are uniformly disposed on the mounting ring.

\* \* \* \* \*